US011496411B1

(12) United States Patent
Kim

(10) Patent No.: US 11,496,411 B1
(45) Date of Patent: Nov. 8, 2022

(54) MANAGEMENT OF NETWORK RESOURCES ACCESSIBLE VIA MULTIPLE NETWORK PORTALS

(71) Applicant: CICINDELAE, INC, Cerritos, CA (US)

(72) Inventor: Do Gi Kim, Los Alamitos, CA (US)

(73) Assignee: CICINDELAE, INC, Cerritos, CA (US)

( * ) Notice: Subject to any disclaimer, the term of this patent is extended or adjusted under 35 U.S.C. 154(b) by 0 days.

(21) Appl. No.: 17/657,083

(22) Filed: Mar. 29, 2022

Related U.S. Application Data

(60) Provisional application No. 63/169,762, filed on Apr. 1, 2021.

(51) Int. Cl.
 *H04L 47/70* (2022.01)
(52) U.S. Cl.
 CPC .................................. *H04L 47/82* (2013.01)
(58) Field of Classification Search
 CPC ...................................................... H04L 47/82
 See application file for complete search history.

(56) References Cited

U.S. PATENT DOCUMENTS

| | | | | |
|---|---|---|---|---|
| 10,192,246 B2 * | 1/2019 | Morgan | ................. | G06Q 30/04 |
| 10,681,160 B1 * | 6/2020 | Hassibi | .................. | H04L 67/02 |
| 2016/0337262 A1 * | 11/2016 | Bayter | ................ | G06F 11/3438 |
| 2017/0286517 A1 * | 10/2017 | Horowitz | ............ | G06F 11/0754 |

* cited by examiner

*Primary Examiner* — Sm A Rahman
(74) *Attorney, Agent, or Firm* — Knobbe Martens Olson & Bear LLP

(57) ABSTRACT

The present disclosure generally relates to database modification, and in particular, database modification in the context of networked platforms accessible by user computing devices. One example context to which such database modification techniques can be applied is a network provider providing a plurality of individual network portals via which users may access network resources and perform other transactions. Such a network provider may maintain a network resource availability database that needs to be updated in response to each network resource access requests being received and granted via the plurality of individual network portals. The techniques described herein allow the network resource availability database of such a network provider to be updated differently depending on the context in which resource requests are granted.

20 Claims, 9 Drawing Sheets

(12) United States Patent

MANAGEMENT OF NETWORK RESOURCES ACCESSIBLE VIA MULTIPLE NETWORK PORTALS

CROSS-REFERENCE TO RELATED APPLICATIONS

This application claims priority to U.S. Provisional Patent Application No. 63/169,762, filed on Apr. 1, 2021, the entire contents of which are incorporated by reference herein in their entirety and for all purposes.

BACKGROUND

Technical Field

The present disclosure generally relates to database modification, and in particular, database modification in the context of networked platforms accessible by user computing devices.

Description of Related Technology

Various computing platforms allow users to access certain network resources via network portals or web pages and perform various transactions such as upload and download content, request access to network resources, grant access to and/or deliver network resources, send and receive network messages, etc. Such platforms may keep track of the various content, network resources, network messages, etc. using database entries, and perform updates to the database entries in response to transactions that alter the statuses of such of the various content, network resources, network messages, etc.

SUMMARY

The present disclosure generally relates to database modification, and in particular, database modification in the context of networked platforms accessible by user computing devices. One example context to which such database modification techniques can be applied is a network provider providing a plurality of individual network portals via which users may access network resources and perform other transactions. Such a network provider may maintain a network resource availability database that needs to be updated in response to each network resource access requests being received and granted via the plurality of individual network portals. The techniques described herein allow the network resource availability database of such a network provider to be updated differently depending on the context in which resource requests are granted.

BRIEF DESCRIPTION OF THE DRAWINGS

The foregoing and other features, aspects and advantages of the present invention are described in detail below with reference to the drawings of various implementations, which are intended to illustrate and not to limit the invention. The drawings comprise the following figures in which.

DETAILED DESCRIPTION OF EMBODIMENTS

Figure 1:
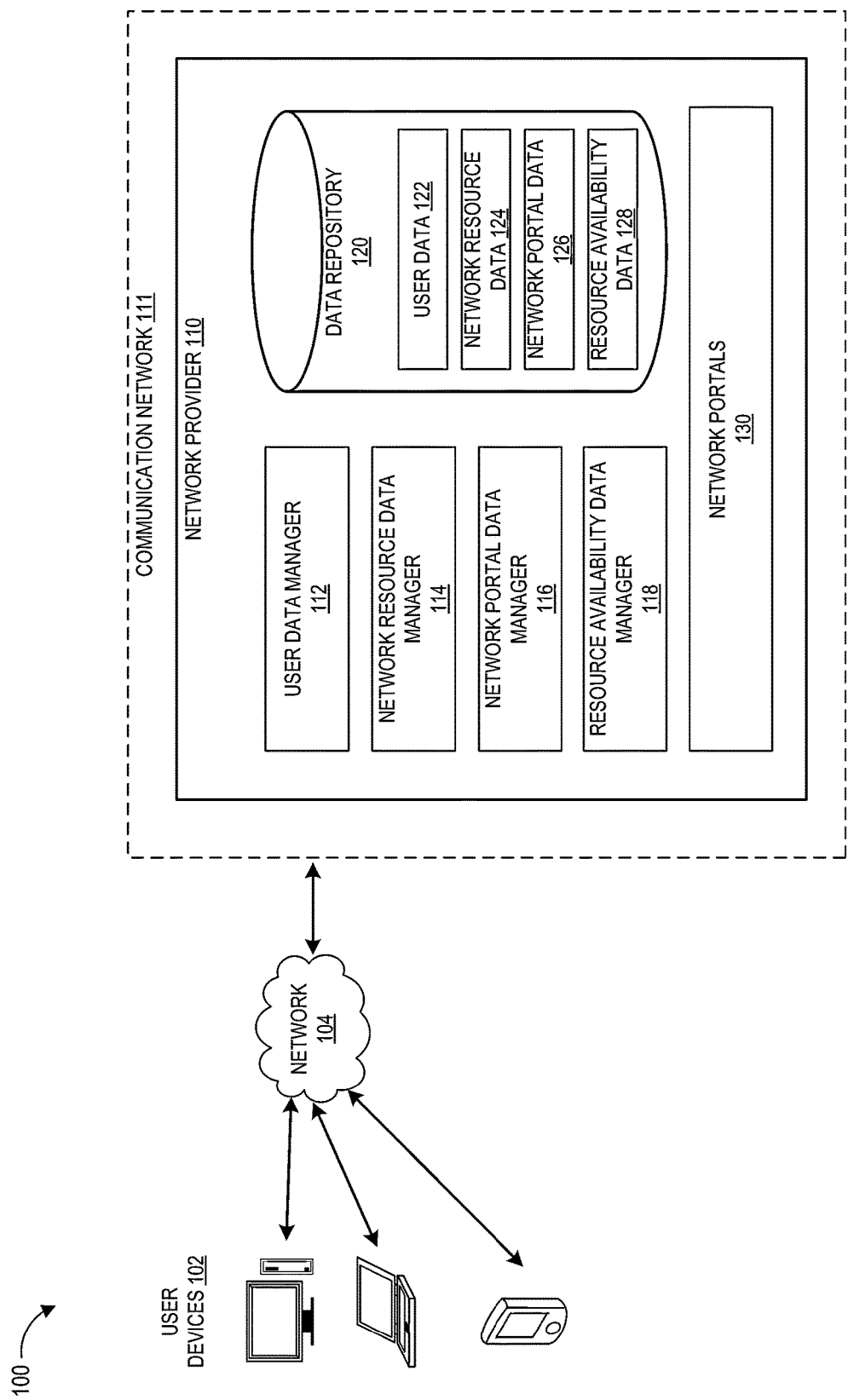
FIG. 1 illustrates a computing environment in accordance with aspects of the present disclosure.

Embodiments of the invention will now be described with reference to the accompanying figures. The terminology used in the description presented herein is not intended to be interpreted in any limited or restrictive manner, simply because it is being utilized in conjunction with a detailed description of certain specific implementations of the invention. Furthermore, embodiments of the invention may comprise several novel features, no single one of which is solely responsible for its desirable attributes or which is essential to practicing the inventions herein described.

Introduction

The present disclosure relates to techniques for network resource management (e.g., provisioning, access control, scheduling, tracking, monitoring, delivery, etc.) within a communication network. A network provider may provide a plurality of network portals via which access to certain network resources, which may be provided by one or more users of the network provider or by the network provider itself, may be requested and granted. For example, a user may connect, on his or her user computing device, to the network portal, view the available network resources, and request access to one or more of the available network resources.

A network portal associated with an internal user of the network provider may provide a listing of the available network resources, and a user visiting the network portal may select one of the available network resources to request access to the network resource. Once the request is processed/granted by the network provider (or the owner of the network resource), access to the selected network resource is provided to the requesting user.

In some cases, the same type of network resources accessible via the network provider may be derived from multiple sources. For example, one user of the network provider may have a first amount of a first network resource (e.g., 5 units of a particular computing resource, digital resources, or physical resource) available for access, lease, or temporary/permanent acquisition by other users of the network provider, and another user of the network provider may have a second amount of the same first network resource (e.g., 10 units of the same network resource). Additionally, these network resources may be accessed, leased, or temporarily or permanently acquired by other users of the network provider via the plurality of network portals provided by the network provider. Thus, it may be cumbersome to keep track of all providers or owners of the network resources as well as the network portals via which such network resources can be accessed, leased, or acquired (or request to access, lease, or acquire may be received) by other users of the network provider.

Further, in some cases, the network resources owned by the users of the network provider may be exhausted, and such network resources may become unavailable to be accessed via the network portals until another user acquires and makes available an additional amount of such network resources to the network provider. This delay may inconvenience the users of the network provider who wish to access (or request access to) such network resources.

The aforementioned challenges, among others, is addressed in some embodiments by the disclosed techniques for allowing the network provider to maintain its own set of network resources that is separately maintained from the network resources of its users for access by users of the network provider. In some cases, the network provider may provide an additional layer of network resource availability by obtaining any additional network resources from a set of external users (e.g., those who may not have or be assigned a network portal), in the event that the network resources of its internal users and the network provider are depleted and additional resource requests are received. By doing so, the network provider improves the network resource availability, thereby improving the experience of its users in requesting access to the network resources provided by the network provider.

Further, in some embodiments, when an internal user obtains (or requests, reserves, leases, purchases, is granted access to, etc.) additional network resources from such an external user (e.g., a user who is not assigned a network portal and thus cannot provision such network resources directly to the visitors of the network portals in the communication network), the network provider may cause the obtained additional network resources to be immediately available via a network portal of the internal user, for further access or request by a visitor of the network portal. For example, the obtained additional network resources may become available for access or request via the network portal of the internal user before the additional network resources are actually granted to, delivered to, received by, or sent to the internal user. In such an example, the obtained additional network resources made available via the network portal of the internal user (or some future access thereto, for example, after the additional network resources are actually obtained by the internal user) may be obtained by (or requested by, reserved by, leased by, purchased by, granted access to, scheduled for provisioning to, etc.) a visitor of the network portal before the additional network resources are actually granted to, delivered to, received by, or sent to the internal user. Alternatively, the obtained additional network resources made available via the network portal of the internal user (or some future access thereto, for example, after the additional network resources are actually obtained by the internal user) may be obtained by (or requested by, leased by, purchased by, granted access to, scheduled for provisioning to, etc.) a visitor of the network portal while the additional network resources are in the processing of being (but has not been) granted to, delivered to, received by, or sent to the internal user. By allowing such additional network resources to be accessed sooner (e.g., by not waiting until the internal user has had a chance to obtain or take possession of the network resources and enable access to such network resources via its network portal) by other users within the communication network, the network provider achieves greater flexibility and efficiency in scheduling, provisioning, or distribution of network resources (e.g., the additional lead time may increases the likelihood that the network resources will be utilized, or reduce the amount of time the network resources are idle).

Additionally, the present disclosure describes techniques for automatically transitioning the database update process/algorithm depending on the context in which a particular network resource is accessed. Depending on which users provided or owned the particular network resource at the time the network resource is accessed, and depending on via which network portal the network resource is accessed, the network provider may appropriately update the database records to reflect the current network resource availability information. For example, the database updating process may be changed depending on whether the users have network resource availability and whether the network provider has network resource availability. By doing so, the network provider facilitates accurate tracking of the currently available network resources.

As will be appreciated by one of skill in the art in light of the present disclosure, the embodiments disclosed herein improve the ability of computing systems, such as network resource provider systems and database systems, to provide mechanisms for simplifying the process of managing network resources and for improving network resource availability.

The presently disclosed embodiments therefore address technical problems inherent within computing systems, such as simplifying network resource management, optimizing database entry modification process, and improving network resource availability. These technical problems are addressed by the various technical solutions described herein, including automatically transitioning the database update process/algorithm depending on the context in which a particular network resource is accessed, and allowing the network provider to maintain its own set of network resources that is separately maintained from the network resources of its users for access by users of the network provider. Thus, the present disclosure represents an improvement on existing network resource provisioning systems, and computing systems in general.

These and other aspects of the disclosure will now be described with regard to certain examples and embodiments, which are intended to illustrate but not limit the disclosure. Although the examples and embodiments described herein will focus, for the purpose of illustration, on specific calculations and algorithms, one of skill in the art will appreciate the examples are illustrate only, and are not intended to be limiting.

Additional Considerations

In some cases, there is a latency between the time at which access to the network resource is requested and the time at which the request is granted. Also, there may be a latency between the time at which the request is granted and the time at which the requested network resource is actually provided to the requesting user.

In some embodiments, a network resource includes computing resources such as CPU, disk, storage, memory, network bandwidth, and/or virtual or physical machines that can be accessed by a user of a user computing device. Such computing resources may be provided by the network provider or by one or more computing systems external to the network provider. Once access to such computing resources is requested, the requested computing resources may be provisioned and assigned/leased to the requesting user. In other embodiments, a network resource includes digital resources such as digital books, database entries, electronic publications, or other types of electronic data. Once access to such digital resources is requested, the digital resources may be electronically delivered to the requesting user. In yet other embodiments, a network resource includes physical resources such as items, products, goods, etc. In such embodiments, once access to the physical resource is requested, the physical resource may be shipped, delivered, or assigned to the requesting user.

In some embodiments, the network resources described herein may each be of limited supply (e.g., only a limited number of requesting users may be able to access a particular resource) or unique (e.g., there may be only one of each network resource). In other embodiments, the network resources may include digitally consumable items that may be copied, accessed, or utilized an effectively unlimited number of times.

A network portal may be provided to each resource-providing user of the network provider. In some cases, a network portal may be provided to each resource-owning user of the network provider. In some cases, a non-resource-providing user of the network provider may be assigned a network portal as well. In some cases, a non-resource-owning user of the network provider may be assigned a network portal as well.

Overview

The present disclosure generally relates to database modification, and in particular, database modification in the context of networked platforms accessible by user computing devices. One example context in which such database modification techniques can be applied is a network provider providing a communication network (or simply, network) of individual network portals (also referred to herein as electronic stores or online stores) that are each managed by one of a plurality of retailers registered with the network provider. Such a network provider may allow retailers to share products with each other, on top of providing traditional dropshipping capabilities (i.e. allowing the retailers to sell manufacturer's items on the retailers' stores). When a product is uploaded by a retailer and shared with other retailers in the network (e.g., retailers registered with the network provider), the shared product becomes not only visible on the retailer's own network portal, but also becomes selectable by other retailers in the network. When selected, the shared product becomes visible (and purchasable) on those retailers' respective online stores along with the retailers' own products (e.g., uploaded by the owners of the online stores) and/or dropshipped products from outside suppliers (e.g., imported from other manufacturers or retailers).

Dropshipping

The network provider described herein allows a supplier's products to be selected and sold by individual retailers in the network on their respective network portals. When a sale is made on a retailer's network portal, the network provider receives a payment from the purchaser, sends a purchase order and shipping instructions to the supplier, and uses the received payment to pay the supplier (e.g., a wholesale price of the sold product) and the retailer (e.g., a commission for selling the product). Then, the supplier ships the product to the purchaser in a box that also includes information about the retailer (e.g., purchaser thinks she bought the product from the retailer). In some implementations, the supplier ships the product to the network provider or the retailer, and the network provider or the retailer then ships the product to the purchaser.

Product Sharing Among Retailers

The network provider, in addition to providing the dropshipping process described above, further allows retailers within the network to upload their own products onto the network and share them with other retailers within the network. When a shared product is selected by a retailer, the product becomes visible (and purchasable) on that retailer's network portal along with the retailer's own products and/or dropshipped products from suppliers. When the shared product is sold on the retailer's online store, the network provider receives a payment from the purchaser, sends shipping instructions to the original retailer who shared the product with the network, and uses the received payment to pay the selling retailer who sold the product (e.g., a commission for selling the product) and the original retailer who shared the product (e.g., a retail price of the sold product minus commissions/fees). Then, the original retailer ships the product to the purchaser in a box that also includes information about the selling retailer (e.g., purchaser thinks she bought the product from the selling retailer).

Retailers' Individual Network Portals

The network provider allows retailers to set up their own network portals within the communication network. For example, a retailer who has her own brick-and-mortar store (also referred to herein as an offline store or a physical store) may register with the network provider and create a network portal that can be loaded with the retailer's own products or other products shared by other retailers within the communication network. The network provider may provide various software tools usable by the retailer to create and modify its network portal. The network portal may be associated with a uniform resource locator (URL) that can be accessed by the customers of the retailer to visit the network portal and browse the purchasable products made available by the retailer.

Adding Items to Network Portals

Items such as clothing, shoes, accessories, and etc. can be added to these network portals. The items can be the store owner's own items (either purchased offline or purchased from a manufacturer or supplier via the network provider) or other retailers' items shared by such other retailers within the communication network provided by the network provider.

Retailer's Own Items

One way of populating a retailer's network portal is with the retailer's own items (e.g., items that the retailer acquired from outside the communication network). The store owner can upload her own items onto the network provider by providing the name, description, model number, picture(s), and quantity of each item that she wants to sell on the network portal, and the item can be displayed to the visitors of the retailer's network portal. The visitors can then purchase the item directly from the retailer's network portal. Alternatively, the retailer can purchase an item (usually in bulk quantities) from a manufacturer registered with the network provider and sell the purchased item on the retailer's network portal. The price at which the retailer purchases the item from the manufacturer is usually lower than the price at which the retailer's customers are willing to purchase the item at the retailer's network portal, so the retailer still makes a profit.

Shared Items Belonging to Other Retailers

Another way of populating a retailer's online store is with items that are shared by other retailers within the communication network provided by the network provider. Any retailer part of the communication network (e.g., registered with the network provider) can choose to share her own items with other retailers within the communication network, and a retailer can select, from the items shared by other retailers, items that she wishes to sell on her own network portal provided by the network provider. The selected items are displayed to the visitors of the retailer's network portal alongside the retailer's own items as if they were the retailer's own items (e.g., indistinguishable by the visitors whether an item displayed on the retailer's network portal is the store owner's own item or an item owned by another retailer in the communication network and shared with the store owner). When an item that belongs to one retailer is sold from the network portal of another retailer, some of the proceeds from the sale are shared with the owner of the item.

Computing Environment

FIG. 1 illustrates a computing environment 100 including user devices 102 and a communication network 111, which are in communication with each other via a network 104. The communication network 111 includes a network provider 110, which includes various components that facilitate and perform the techniques described herein. The users at the user devices 102 can access and interact with, via the network 104, various network resources provided by the network provider 110. Such network resources may include network portals (also referred to herein as electronic stores or online stores) and management tools usable to configure the network portals.

Network of Users and Network Portals Provided by Network Provider

The communication network 111 is a network of users and network portals provided by the network provider 110. The communication network 111 includes a group of users (e.g., retailers, manufacturers, and/or consumers) interconnected by the network provider 110 such that the users in the group can share items with each other and facilitate transactions on behalf of each other. For example, an item owned and uploaded by one retailer may be sold via another retailer's network portal along with the store owner's own item and/or another item provided by a manufacturer. This type of network facilitates sharing of items across multiple network portals and increases the overall visibility of the shared items.

Network Provider

In FIG. 1, the network provider 110 includes a user data manager 112, a network resource data manager 114 (also referred to herein as item data manager 114), a network portal data manager 116 (also referred to herein as store data manager 116), a resource availability data manager 118 (also referred to herein as inventory data manager 118), data repository 120, and network portals 130 (also referred to herein as network stores 130). The data repository 120 includes user data 122, network resource data 124 (also referred to herein as item data 124), network portal data 126 (also referred to herein as store data 126), and resource availability data 128 (also referred to herein as inventory data 128). The network provider 110 may be implemented by one or more computing devices that may communicate with data depository 120. The network provider 110 may also operate in a distributed computing environment including several computer systems that are interconnected using one or more computer networks. Moreover, the processing of the various components or modules of the network provider 110 can be distributed across multiple machines, networks, or other computing resources. The various components or modules of the network provider 110 can also be implemented in one or more virtual machines or hosted computing environment (e.g., "cloud") resources, rather than in dedicated servers.

User Data

The user data manager 112 creates, updates, and manages the user data 122. The user data 122 may include any data regarding the users accessing the communication network 111 via the user devices 102, which may include, for example, retailers, customers, and manufacturers. The retailers may be in the business of purchasing goods from manufacturers or wholesalers and selling the purchased goods to consumers. The customers may be consumers who visit the network portals provided by the network provider 110 and purchase the items made available on the network portals. The manufacturers may be in the business of manufacturing goods and selling the manufactured goods to the retailers or to the consumers via the retailers. In some implementations, the retailers and/or the manufacturers include brands, designers, distributers, or other types of sellers/vendors. For example, the user data 122 associated with a given user may include a user identifier, the user's email address, the user's network portal information, the user's profile information, and the like.

Item Data

The item data manager 114 creates, updates, and manages the item data 124. The item data 124 may include any data regarding the items available on the communication network 111, which may include, for example, any item or product associated with one or more users of the communication network 111 such as brands, retailers, designers, manufacturers, distributers, sellers, vendors, owners, etc. In implementations, the item can include any type of clothing, legwear, socks, sunglasses, hats, belts, shoes, jewelry, beauty products and fashion accessories, etc. In this disclosure, the term "item" is used interchangeably to refer to an item itself (e.g., a particular product, service, any of the items referred to above, or the like) and to its description or representation in a computer system. As will be apparent from the context in which it is used, the term is also sometimes used herein to refer only to the item itself or only to its representation in the computer system. For example, the item data 124 associated with a given item may include an item identifier, the item's owner, the item's manufacturer, an item model number, an item price, an item color, an item size, an item category, whether the item is shared with users other than its owner, and the like.

Store Data

The store data manager 116 creates, updates, and manages the store data 126. The store data 126 may include any data regarding the network portals 130 within the communication network 111 (e.g., network portals belonging to the retailers within the communication network 111). For example, the store data 126 associated with a given network portal 130 may include a network portal identifier, the network portal's owner, the network portal's location or URL, the network portal's contact information, the network portal's configuration settings for displaying the items, the network portal's item filters for importing shared items from the communication network 111, and the like.

Inventory Data

The inventory data manager 118 creates, updates, and manages the inventory data 128. The inventory data 126 may include any data regarding the availability and available quantities of the items available on the communication network 111. For example, the inventory data 128 associated with a given item may include an item identifier, the item's owner, quantity available for sale (e.g., not yet sold), quantity in the warehouse (e.g., not yet shipped), location(s) of the item, and the like.

Other Types of Data

Although not shown in FIG. 1, the network provider 110 may maintain other types of data, for example, such as invoice data, transaction data, and the like.

Data Repository

The data repository 120 may be implemented on a single storage device or across multiple storage devices. The user data 122, item data 124, store data 126, and inventory data 128 may be stored in a single database or across multiple databases.

Database Entries

The data repository 120 may include one or more databases for storing data generated within the communication network 111. For example, the user data 122 may be stored in a user database having a set of database entries, the item data 124 may be stored in an item database having a set of database entries, the store data 126 may be stored in a store database having a set of database entries, and the inventory data 128 may be stored in an inventory database having a set of database entries. Each user, item, or store in the communication network 111 may have a corresponding database entry in the one or more databases. Links or associations may be created between certain database entries using a primary key that is common to both or all of such database entries.

Network Portals

The network portals 130 are online stores of the retailers within the communication network 111. The network portals 130 described herein may include any set of network pages, screens, presentations, screen representations, content, etc. that can be used to allow visitors/viewers to browse and purchase items. In some implementations, the network portals 130 are accessible using uniform resource locators (URLs) or other addresses. Each network portal 130 may include one or more network pages dedicated to the individual purchasable item available via the network portal. Such a network page may include details regarding the particular item, such as one or more pictures of the item, a description of the item, a price of the item, etc. The network portal 130 and its individual network pages may be created by the network provider 110 at the direction of the owner (e.g., retailer within the communication network 111) of the network portal, for example, via a user interface provided by the network provider's web page or mobile application).

User Interface

The network provider 110 may provide the user devices 102 with one or more user interfaces for utilizing one or more network services provided by the network provider 110 (e.g., to upload, share, and browse content and/or items, to configure network portals, to perform transactions such as purchase items, etc.). The user devices 102 may have a browser application implemented thereon or a mobile application dedicated to the network provider 110 that uses text, graphics, audio, video, and other media to present data and to allow interaction with the network provider 110.

Product Filters

To facilitate the sharing of items by the retailers within the communication network, the network provider 110 may present user interface tools usable by a given retailer to configure the filters for identifying one or more of the shared items to be displayed on the given retailer's network portal and made visible by the visitors of the given retailer's network portal. For example, a retailer may configure a product filter to specify that yellow shirts in the price range of $20-$35 should be imported into the retailer's network portal. As another example, the retailer may configure a product filter by specifying the product identifiers of the products that the retailer wishes to import into the retailer's network portal. When a customer visits the retailer's network portal, the provider network allows the customer to see one or more of the products from the communication network that satisfy the retailer's product filter, along with the retailer's own products, if any. In some implementations, instead of using filters, the selling retailer can manually select the shared products from the sharing retailer's online store.

Products to be Shown on Network Portals

The network provider 110 may maintain information regarding which online stores should list which items stored in the data repository 120. For example, the network provider 110 may periodically generate and update such a list based on the retailer's manual selection or product filters as needed. Alternatively, the list of products may be dynamically generated on the fly at the time a customer visits a given online store, using the store owner's product filter without previously storing such a list of products in the data repository 120.

Other Components

Each of the devices 102 may be a desktop computer, a laptop computer, a portable computing device, a smartphone, a tablet computer, or any other computing device. The network 104 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. For example, the network 104 may be a publicly accessible network of linked networks such as the Internet. Protocols and components for communicating via the Internet or any of the other aforementioned types of communication networks are well known to those skilled in the art and, thus, are not described in more detail herein.

Workflow #1

Figure 2:
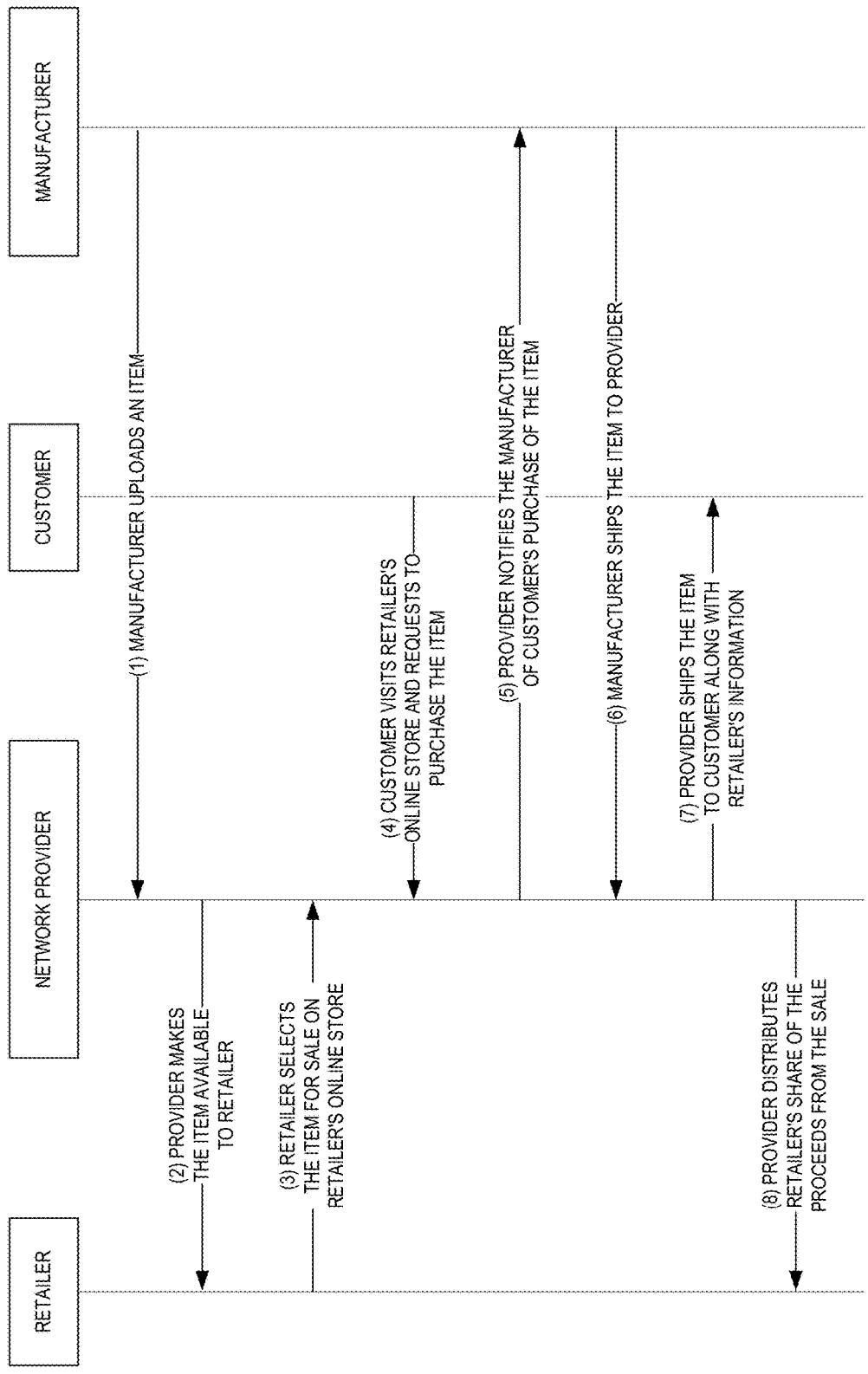
FIG. 2 depicts a workflow diagram illustrating the interactions between the various entities in accordance with aspects of the present disclosure.

With reference to FIG. 2, an example workflow diagram illustrating the interactions between the various entities in the network of the network provider 110 in accordance with aspects of the present disclosure is described. At (1), a manufacturer uploads an item. The item may be a product manufactured by the manufacturer that the manufacturer wishes to sell via the communication network 111. At (2), the network provider makes the item available to a retailer within the communication network 111. At (3), the retailer selects the item for sale on the retailer's online store. Upon the retailer's selection of the item, the network provider may create or update one or more relevant database entries in the data repository 120 to indicate that the item should be visible and purchasable on the retailer's online store. For example, the network provider may add an entry to a database table that includes the list of items that are available for sale on the retailer's online store along with the manufacture's item's item identifier and other item information.

At (4), a customer visits the retailer's online store and requests to purchase the item. In response, at (5), the network provider notifies the manufacturer of the customer's purchase of the item. In response, at (6), the manufacturer ships the item to the network provider. At (7), the network provider ships the item to the customer along with the retailer's information (e.g., the retailer's store name, contact information, return policy, etc.). At (8), the network provider distributes the retailer's share of the proceeds from the sale of the item (e.g., using the payment received from the customer at the time of purchase).

Workflow #2

Figure 3:
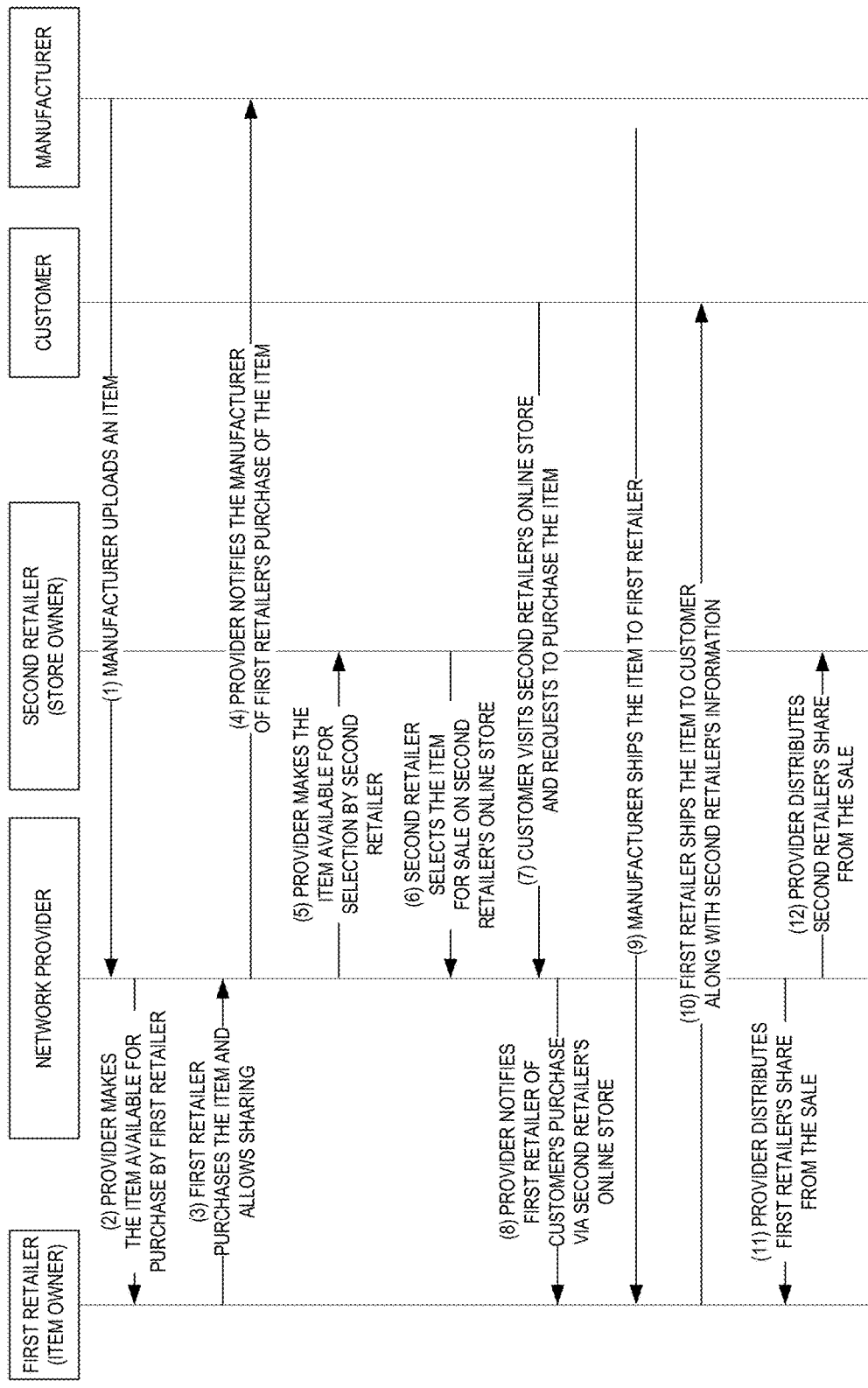
FIG. 3 depicts another workflow diagram illustrating the interactions between the various entities in accordance with aspects of the present disclosure.

With reference to FIG. 3, another example workflow diagram illustrating the interactions between the various entities in the network of the network provider 110 in accordance with aspects of the present disclosure is described. At (1), a manufacturer uploads an item. The item may be a product manufactured by the manufacturer that the manufacturer wishes to sell via the communication network 111. At (2), the network provider makes the item available for purchase by a first retailer within the communication network 111. At (3), the first retailer purchases the item and allows the item to be shared to other retailers within the communication network 111. Upon the first retailer's purchase of the item, the network provider may create or update one or more relevant database entries in the data repository 120 to indicate that the item is now owned by the first retailer, that the item should be visible and purchasable on the first retailer's online store, that the item is shared with other retailers within the communication network 111, and that the first retailer now has available inventory of the first item. For example, the network provider may add or update a relevant entry to a database table, where the entry includes the item's owner (e.g., first retailer), available quantity (e.g., to reflect the number of units purchased from the manufacturer), whether to display the item on the first retailer's online store, whether the item is to be shared with other retailers (e.g., shared), etc.

At (4), the network provider notifies the manufacturer of the first retailer's purchase of the item, and at (5), the provider makes the item available for selection by a second retailer for sale on the second retailer's online store. At (6), the second retailer selects the item for sale on the second retailer's online store. At (7), a customer visits the second retailer's online store and requests to purchase the item. In response, at (8), the network provider notifies the first retailer of the customer's purchase of the item via the second retailer's online store, along with shipping information of the customer. Although not illustrated, the network provider may also notify the second retailer of the customer's purchase of the item via the second retailer's online store.

At (9), the manufacturer ships the item to the first retailer. At (10), the first retailer ships the item to the customer along with the second retailer's information (e.g., the second retailer's store name, contact information, return policy, etc.). At (11), the network provider distributes the first retailer's share of the proceeds (e.g., retail price minus fees/commissions) from the sale of the item (e.g., using the payment received from the customer at the time of purchase). At (12), the network provider distributes the second retailer's share of the proceeds (e.g., commission for facilitating the sale via its online store) from the sale of the item (e.g., using the payment received from the customer at the time of purchase).

Workflow #3

Figure 4:
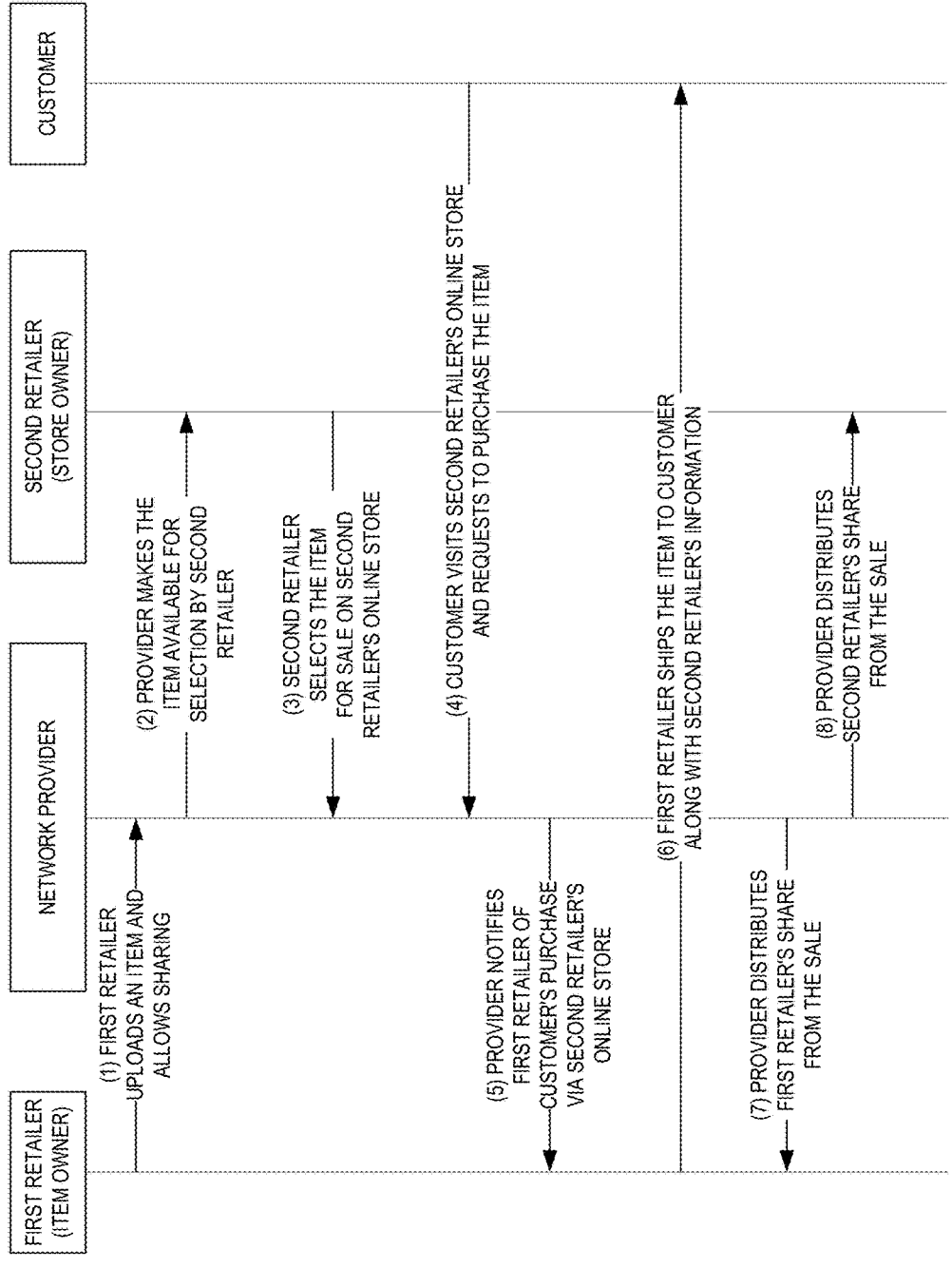
FIG. 4 depicts yet another workflow diagram illustrating the interactions between the various entities in accordance with aspects of the present disclosure.

With reference to FIG. 4, yet another example workflow diagram illustrating the interactions between the various entities in the network of the network provider 110 in accordance with aspects of the present disclosure is described. At (1), the first retailer uploads an item and allows the item to be shared to other retailers within the communication network 111. The item may be a product made by the first retailer or acquired by the first retailer from an entity outside the communication network 111. Upon the first retailer's upload of the item, the network provider may create or update one or more relevant database entries in the data repository 120 to indicate that the item is now owned by the first retailer, that the item should be visible and purchasable on the first retailer's online store, that the item is shared with other retailers within the communication network 111, and that the first retailer now has available inventory of the first item. For example, the network provider may add or update a relevant entry to a database table, where the entry includes the item's owner (e.g., first retailer), quantity available for sale (e.g., to reflect the number of units indicated by the first retailer), quantity in inventory (e.g., to reflect the number of units indicated by the first retailer), whether to display the item on the first retailer's online store, whether the item is to be shared with other retailers (e.g., shared), etc.

Upon determining that the uploaded item is to be shared with other retailers within the communication network 111, at (2), the network provider makes the item available for selection by a second retailer for sale on the second retailer's online store. At (3), the second retailer selects the item for sale on the second retailer's online store. At (4), a customer visits the second retailer's online store and requests to purchase the item. In response, at (5), the network provider notifies the first retailer of the customer's purchase of the item via the second retailer's online store, along with shipping information of the customer. Although not illustrated, the network provider may also notify the second retailer of the customer's purchase of the item via the second retailer's online store.

At (6), the first retailer ships the item to the customer along with the second retailer's information (e.g., the second retailer's store name, contact information, return policy, etc.). At (7), the network provider distributes the first retailer's share of the proceeds (e.g., retail price minus fees/commissions) from the sale of the item (e.g., using the payment received from the customer at the time of purchase). At (8), the network provider distributes the second retailer's share of the proceeds (e.g., commission for facilitating the sale via its online store) from the sale of the item (e.g., using the payment received from the customer at the time of purchase).

Retailers Sign Up

Retailers A and B each sign up for a user account with the network provider 110 and operate an online store via the network provider 110.

Retailer Uploads Item to Retailer's Own Store

Retailer A wants to sell a leather belt on his online store. Retailer A provides the leather belt's name, description, make/model, and picture(s) and specifies the quantity Retailer A has available for sale. The network provider 110 creates an item entry in its item database, assigns a unique ID to Retailer A's leather belt, fills in the information provide by Retailer A such as the leather belt's name, description, make/model, picture(s), etc., if the leather belt is being submitted to the network provider 110 for the first time. The network provider 110 also creates an inventory entry in its inventory database with the unique ID assigned to the leather belt, and fills in the quantity and the owner (Retailer A). For example, the network provider 110 may add Retailer A's unique ID to the inventory entry to indicate that Retailer A is the owner of the item corresponding to the inventory entry (i.e. the leather belt).

Retailer Shares Uploaded Item with Other Retailers

Retailer A also wants to share the leather belt with other retailers in the communication network 111 and thus allow Retailer A's leather belt to be sold by such other retailers at their respective online stores. The network provider 110 updates the item entry corresponding to the leather belt to indicate that the leather belt is also available for sale by retailers other than Retailer A.

Retailer Selects Item Purchased from Manufacturer

Retailer B wants to sell, on his own online store, a dress shirt that he purchased from a manufacturer in the communication network 111. Since the dress shirt was purchased via the network provider 110, the item database may already have an item entry corresponding to the dress shirt, and the network provider 110 may not need to create a new item entry for the dress shirt. The network provider 110 creates another inventory entry in its inventory database, assigns a unique ID to Retailer B's dress shirt, fills in the information extracted from the purchase of the dress shirt (the network provider 110 has access to this information since the purchase occurred via the network provider 110) such as the dress shirt's name, description, make/model, picture(s), quantity, and specifies in the inventory entry that the owner of the dress shirt is Retailer B (e.g., by adding Retailer B's unique ID to the inventory entry).

Retailer Selects Item Shared by Another Retailer

Retailer B also wants to sell the leather belt shared by Retailer A on his own online store (Retailer B's online store). Using a user interface provided by the network provider 110, Retailer B creates a filter that allows items of the other retailers in the communication network 111 to be displayed on Retailer B's online store. The filter may specify the item type, color, price range, retailer ID, item ID, and/or any combination thereof. Shared items that satisfy Retailer B's filter are displayed on Retailer B's online store as if they were Retailer B's own items.

Customer Visits Retailer's Online Store

Customer X visits Retailer B's online store. In response, the network provider 110 generates an item page that is displayed on Customer X's terminal display screen, using Retailer B's filter and the information stored in the databases of the network provider 110. The item page includes Retailer B's own items (including the dress shirt), as well as other shared items that do not belong to Retailer B but satisfy Retailer B's filter such as Retailer A's leather belt. Retailer A's leather belt can be viewed and purchased by Customer X on Retailer B's online store as if it were Retailer B's own item. In other words, Customer X cannot tell that the leather belt does not belong to the owner of the online store (i.e. Retailer B).

Customer Browses Store Owner's and Other Retailer's Items

If Customer X visits Retailer B's online store and conducts a keyword search for "belt", the network provider 110 generates a search result page that is displayed on Customer X's terminal display screen, and the search result page includes both Retailer A's leather belt as well as other belts available for purchase on Retailer B's online store (e.g., Retailer A's own belts and/or belts belonging to other retailers) but does not include belts available for purchase in the communication network 111 that do not satisfy Retailer B's filter.

Central Website for Browsing and Searching all Online Stores

In some implementations, the network provider 110 may provide a central web page for browsing and searching some or all of the online stores registered with the network provider 110. For example, if Customer X conducts a keyword search for "belt" on such a central web page, the network provider 110 generates a search result page that is displayed on Customer X's terminal display screen, and the search result page includes Retailer A's leather belt and other belts available for purchase via the network provider 110. For example, the search result page may include all the belts that would have been displayed had Customer X conducted the keyword search on Retailer B's online store instead, and additional belts that do not satisfy Retailer B's filter.

Customer Purchases Another Retailer's Item from Store Owner Retailer's Online Store Customer X places a specific quantity of Retailer A's leather belt into his electronic shopping cart provided on Retailer B's online store. Subsequently, Customer X purchases Retailer A's leather belt from Retailer B's online store for the specific quantity.

Network Provider Receives Money from Customer

The network provider 110 receives money from Customer X for the purchase of Retailer A's leather belt on Retailer B's online store.

Network Provider Generates Log Entry for Customer's Transaction

The network provider 110 generates a log entry for the sales transaction that says "Retailer A's leather belt was purchased by Customer X from Retailer B's store."

Network Provider Sends Transaction Confirmation to Customer

The network provider 110 generates and sends a purchase confirmation statement to Customer X. The purchase confirmation statement indicates that Customer X purchased the leather belt from Retailer B's online store, and includes transaction details such as the quantity, price, and payment receipt. However, Customer X cannot tell from the purchase confirmation receipt that the leather belt that he purchased is actually owned by someone other than Retailer B.

Network Provider Updates Inventory Database to Reflect Transaction

The network provider 110 updates the inventory database to update the quantity of Retailer A's leather belt available for sale on the individual online stores provided by the network provider 110. For example, the network provider's inventory database indicates that, among the total quantity of Retailer A's leather belt in inventory (e.g., the quantity actually sitting in Retailer A's warehouse), the quantity of Retailer A's leather belt purchased by Customer X is not available for sale.

Transactions Via Other Online Stores May Exhaust Item Owner's Available Inventory If Customer X purchased all of the available quantity of Retailer A's leather belt, the network provider 110 sets the available quantity in the inventory entry associated with Retailer A's leather belt to zero so that Retailer A's leather belt no longer appears on any retailer's online store going forward (until Retailer A restocks).

Network Provider Sends Shipping Notification to Item Owner Retailer

The network provider 110 sends a shipping notification to Retailer A indicating that Retailer A needs to ship a specified quantity of the leather belt to Customer X (with whom Retailer A has no relationship) for a sale that Retailer B (with whom Retailer A also has no relationship) made from Retailer B's own online store. The shipping notification also includes the shipping address of Customer X.

Item Owner Ships Purchased Item to Customer with Store Owner's Information

Retailer A ships the purchased quantity of the leather belt to Customer X. In some implementations, Retailer A ships the leather belt with Retailer B's information (e.g., instead of Retailer A's information). In other implementations, Retailer A ships the leather belt with Retailer A's information.

Network Provider Updates Inventory Database to Reflect Shipping

After shipping, Retailer A tells network provider 110 that the purchased leather belt has been shipped. The network provider 110 (an entity different from the entity doing the shipping) updates the inventory database by reducing the total quantity of Retailer A's leather belt in inventory by the purchased and shipped quantity of Retailer A's leather belt. In other implementations, Retailer A provides the updated inventory information to the network provider 110 and the network provider 110 updates the inventory database accordingly.

Network Provider Distributes Proceeds from Transaction to Item Owner Who Didn't Sell Item The network provider 110 sends a portion of the money received from Customer X to the owner of the purchased leather belt (Retailer A) even though the sale was made by another retailer (Retailer B) via that retailer's own online store.

Network Provider Distributes Proceeds from Transaction to Store Owner Who Doesn't Own Item The network provider 110 sends a portion of the money received from Customer X to the owner of the online store from which the leather belt was purchased (Retailer B) even though the leather belt was owned by someone other than the owner of the online store.

Quantity Available for Purchase Vs. Inventory Quantity

As discussed above, the network provider 110 updates the database to reflect the reduction in the quantity available for purchase (e.g., quantity not yet sold), and also updates the database to reflect the reduction in the quantity in inventory (e.g., quantity not yet shipped).

Improvements to Database Update Method

As shown in FIGS. 2-4, numerous scenarios can exist in which the item being sold to the customer is owned by different entities (e.g., by the manufacturer, by the network provider, by the retailer making the sale, by a retailer other than the retailer making the sale, etc.). In these different scenarios, the database updates that are needed may differ. Thus, a database update method that takes the context (e.g., ownership and inventory status) into account would be advantageous and is provided by the techniques described herein. These techniques are described in greater detail below with reference to FIGS. 5-8.

Context-Aware Database Update Process

Figure 5:
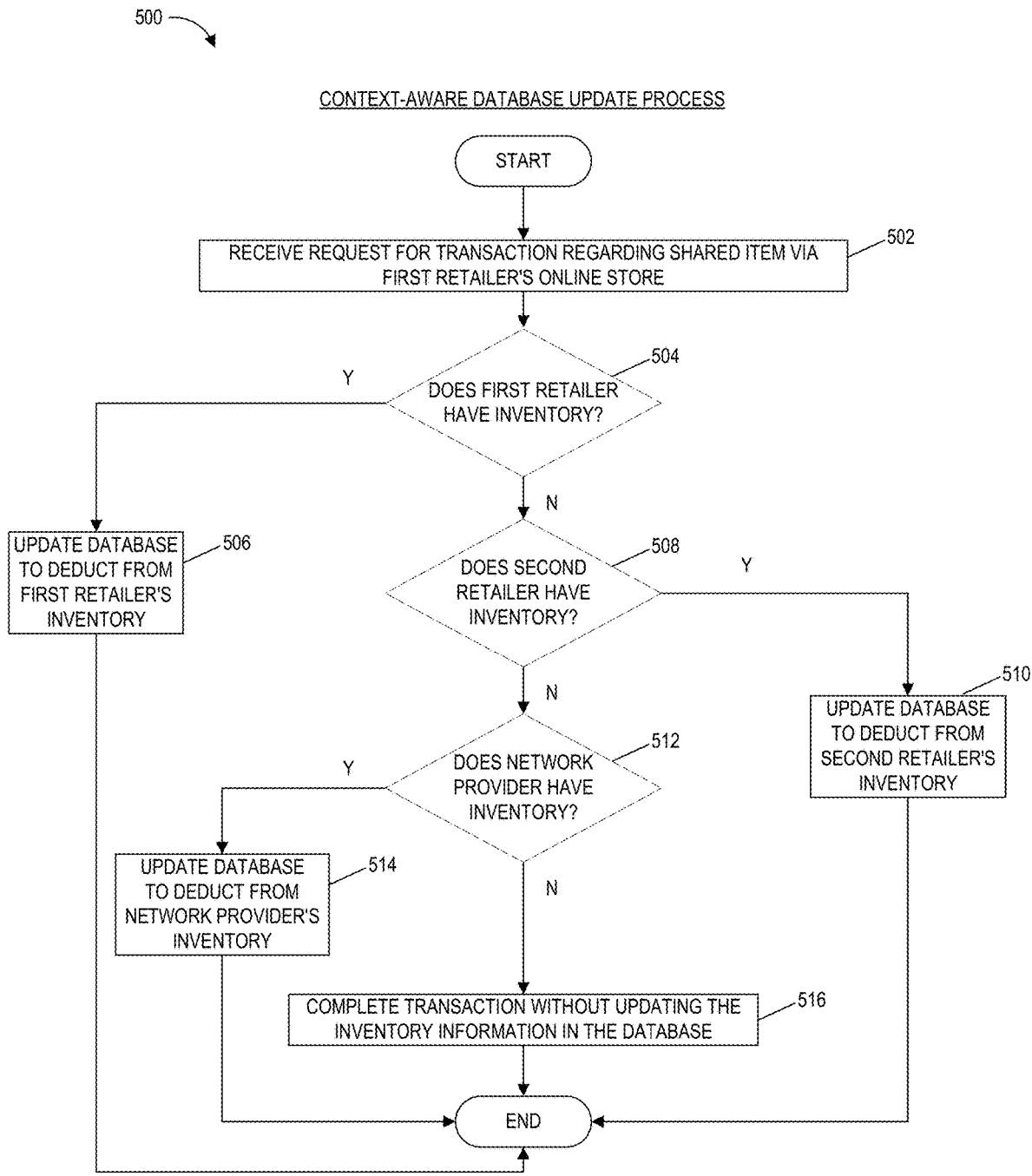
FIG. 5 is a flowchart of an example process for updating a database in accordance with aspects of the present disclosure.

FIG. 5 depicts an illustrative process 500 for updating a database in a context-aware manner in accordance with aspects of the present disclosure. The process 500 may be carried out, for example, by the network provider 110 (or a component thereof such as the inventory data manager 118). For convenience, some or all of the steps of the process 500 are described as being performed by the network provider 110. For example, the network provider 110 may include one or more hardware computing devices and non-transitory physical computer storage storing instructions that, when executed by the one or more hardware computing devices, cause the one or more hardware computing devices to perform the steps of the process 500.

The process 500 begins at block 502, where the network provider 110 receives, from a user computing device 102 (e.g., associated with a visitor), a request to purchase a shared item via a first retailer's online store.

At block 504, the network provider 110 determines whether the first retailer (i.e. the owner of the online store) has available inventory of the shared item. If the network provider 110 determines that the first retailer has available inventory of the shared item, the process 500 proceeds to block 506, where the network provider 110 updates the database to deduct the number of units of the shared item purchased by the visitor from the first retailer's inventory. Otherwise, the process 500 proceeds to block 506.

At block 508, the network provider 110 determines whether a second retailer (e.g., a retailer other than the owner of the online store via which the transaction occurred at block 502) has available inventory of the shared item. If the network provider 110 determines that the second retailer has available inventory of the shared item, the process 500 proceeds to block 510, where the network provider 110 updates the database to deduct the number of units of the shared item purchased by the visitor from the second retailer's inventory. Otherwise, the process 500 proceeds to block 512.

At block 512, the network provider 110 determines whether the network provider 110 has available inventory of the shared item. Although not illustrated, the network provider 110 may, prior to block 512, confirm that none of the retailers in the communication network 111 has available inventory of the shared item. If the network provider 110 determines that the network provider 110 has available inventory of the shared item, the process 500 proceeds to block 514, where the network provider 110 updates the database to deduct the number of units of the shared item purchased by the visitor from the network provider's own inventory. Otherwise, the process 500 proceeds to block 516.

At block 516, the network provider 110 completes the transaction without updating the inventory information of any of the retailers in the communications network 111 and the network provider. The process 500 may then end.

The process 500 can include fewer, more, or different blocks than those illustrated in FIG. 5 and/or one or more blocks illustrated in FIG. 5 may be modified, omitted, or switched without departing from the spirit and scope of the description. Moreover, it will be appreciated by those skilled in the art and others that some or all of the functions described in this disclosure may be embodied in software executed by one or more processors of the network provider 110 and/or the computing devices disclosed herein.

Example Process of Transitioning Database Update Process #1

Figure 6:
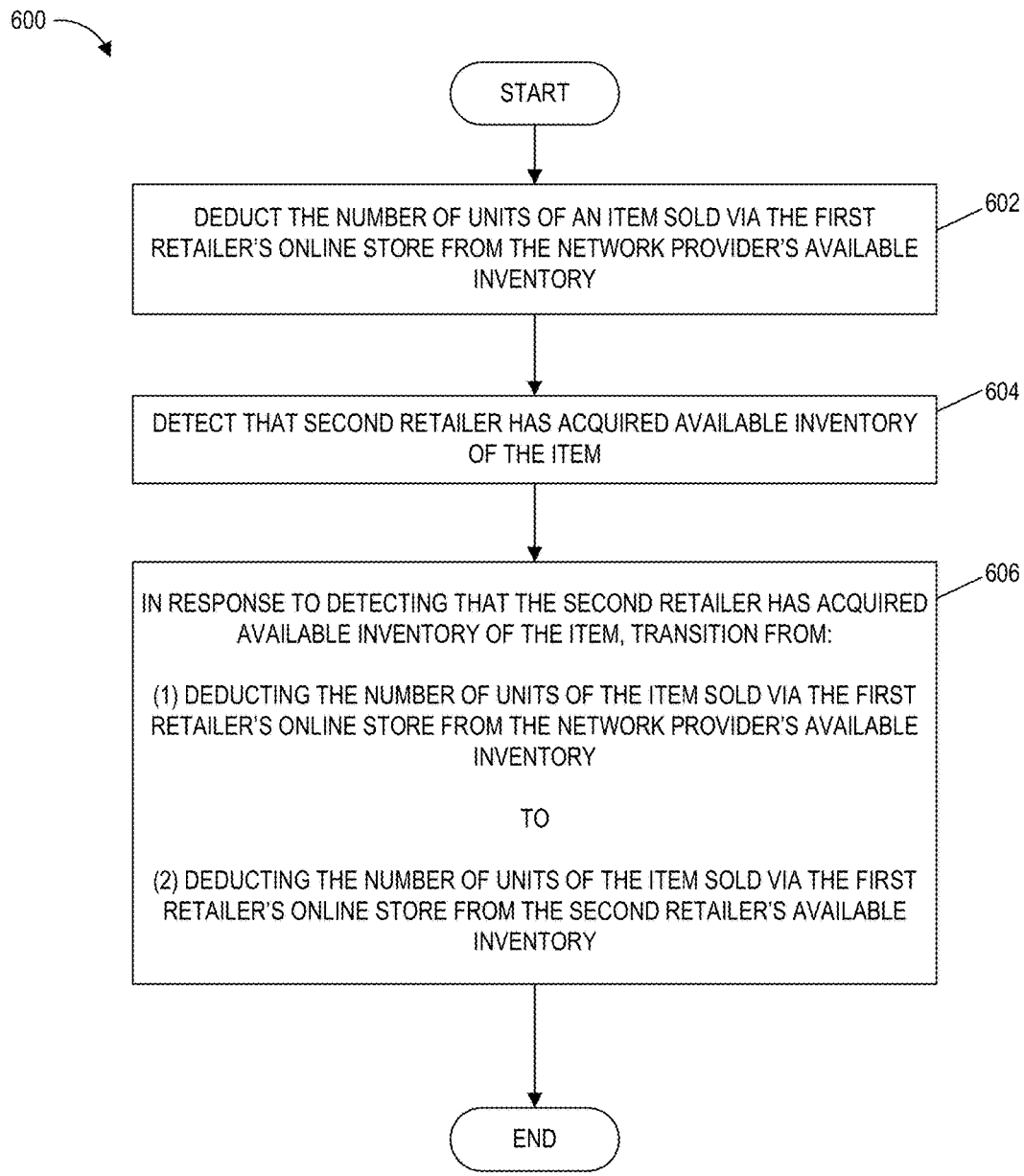
FIG. 6 is a flowchart of an example process for transitioning the database update process in accordance with aspects of the present disclosure.

FIG. 6 depicts an illustrative process 600 for transitioning the database update process in accordance with aspects of the present disclosure. The process 600 may be carried out, for example, by the network provider 110 (or a component thereof such as the inventory data manager 118). For convenience, some or all of the steps of the process 600 are described as being performed by the network provider 110. For example, the network provider 110 may include one or more hardware computing devices and non-transitory physical computer storage storing instructions that, when executed by the one or more hardware computing devices, cause the one or more hardware computing devices to perform the steps of the process 600.

The process 600 begins at block 602, where the network provider 110 updates the inventory database by deducting the number of units of an item sold via a first retailer's online store from the network provider's available inventory.

At block 604, the network provider 110 detects that a second retailer has acquired available inventory of the item.

At block 606, in response to detecting that the second retailer has acquired available inventory of the item, the network provider 110 transitions from (1) deducting the number of units of the item sold via the first retailer's online store from the network provider's available inventory in response to such sale being made via the first retailer's online store, to (2) deducting the number of units of the item sold via the first retailer's online store from the second retailer's available inventory in response to such sale being made via the first retailer's online store. The process 600 may then end.

The process 600 can include fewer, more, or different blocks than those illustrated in FIG. 6 and/or one or more blocks illustrated in FIG. 6 may be modified, omitted, or switched without departing from the spirit and scope of the description. Moreover, it will be appreciated by those skilled in the art and others that some or all of the functions described in this disclosure may be embodied in software executed by one or more processors of the network provider 110 and/or the computing devices disclosed herein.

Example Process of Transitioning Database Update Process #2

Figure 7:
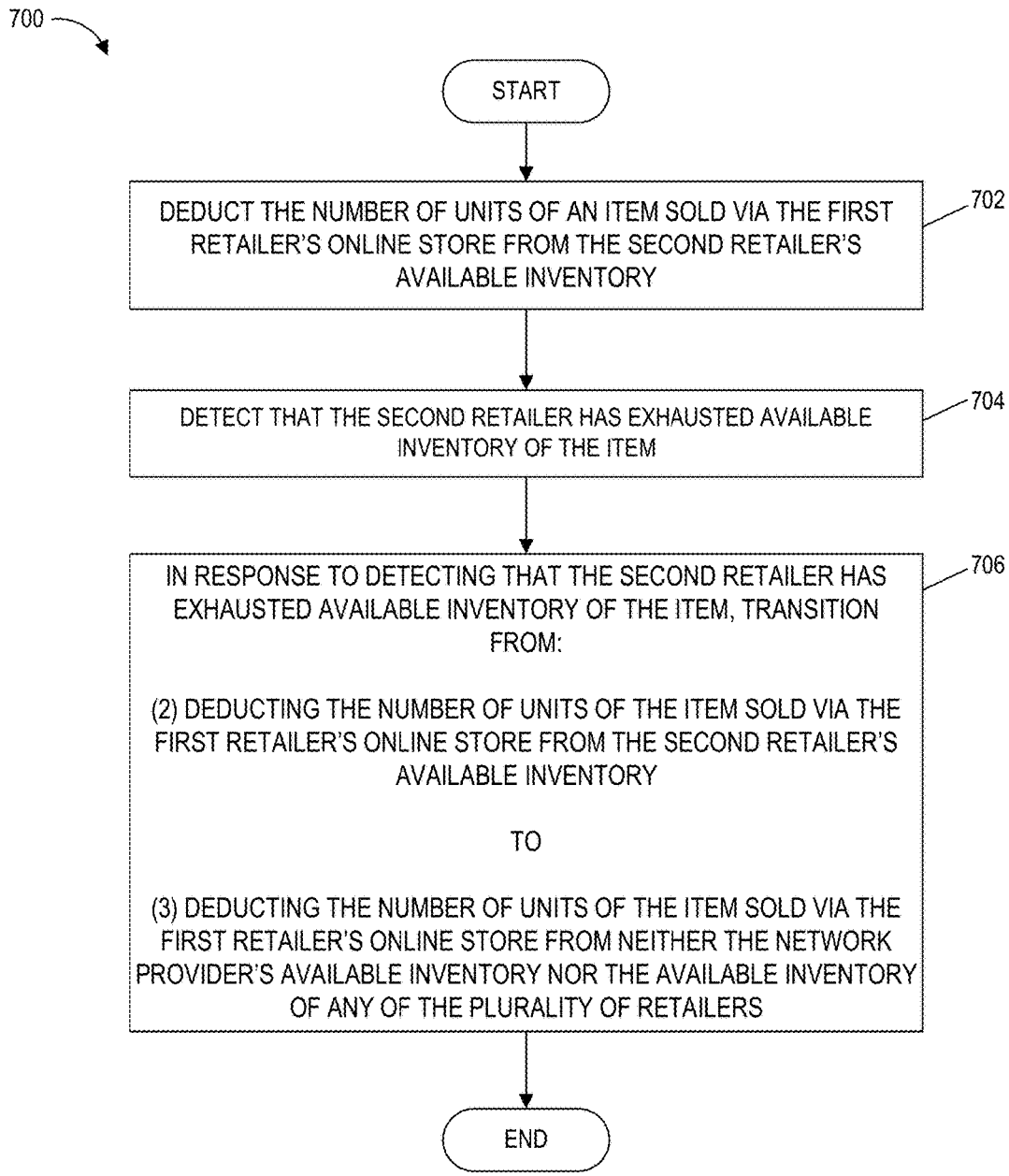
FIG. 7 is another flowchart of an example process for transitioning the database update process in accordance with aspects of the present disclosure.

FIG. 7 depicts another illustrative process 700 for transitioning the database update process in accordance with aspects of the present disclosure. The process 700 may be carried out, for example, by the network provider 110 (or a component thereof such as the inventory data manager 118). For convenience, some or all of the steps of the process 700 are described as being performed by the network provider 110. For example, the network provider 110 may include one or more hardware computing devices and non-transitory physical computer storage storing instructions that, when executed by the one or more hardware computing devices, cause the one or more hardware computing devices to perform the steps of the process 700.

The process 700 begins at block 702, where the network provider 110 updates the inventory database by deducting the number of units of an item sold via a first retailer's online store from a second retailer's available inventory.

At block 704, the network provider 110 detects that a second retailer has exhausted available inventory of the item.

At block 706, in response to detecting that the second retailer has exhausted available inventory of the item, the network provider 110 transitions from (2) deducting the number of units of the item sold via the first retailer's online store from the second retailer's available inventory in response to such sale being made via the first retailer's online store, to (3) deducting the number of units of the item sold via the first retailer's online store from neither the network provider's available inventory nor the available inventory of any of the retailers within the communication network 111 in response to such sale being made via the first retailer's online store. The process 700 may then end.

The process 700 can include fewer, more, or different blocks than those illustrated in FIG. 7 and/or one or more blocks illustrated in FIG. 7 may be modified, omitted, or switched without departing from the spirit and scope of the description. Moreover, it will be appreciated by those skilled in the art and others that some or all of the functions described in this disclosure may be embodied in software executed by one or more processors of the network provider 110 and/or the computing devices disclosed herein.

Example Process of Transitioning Database Update Process #3

Figure 8:
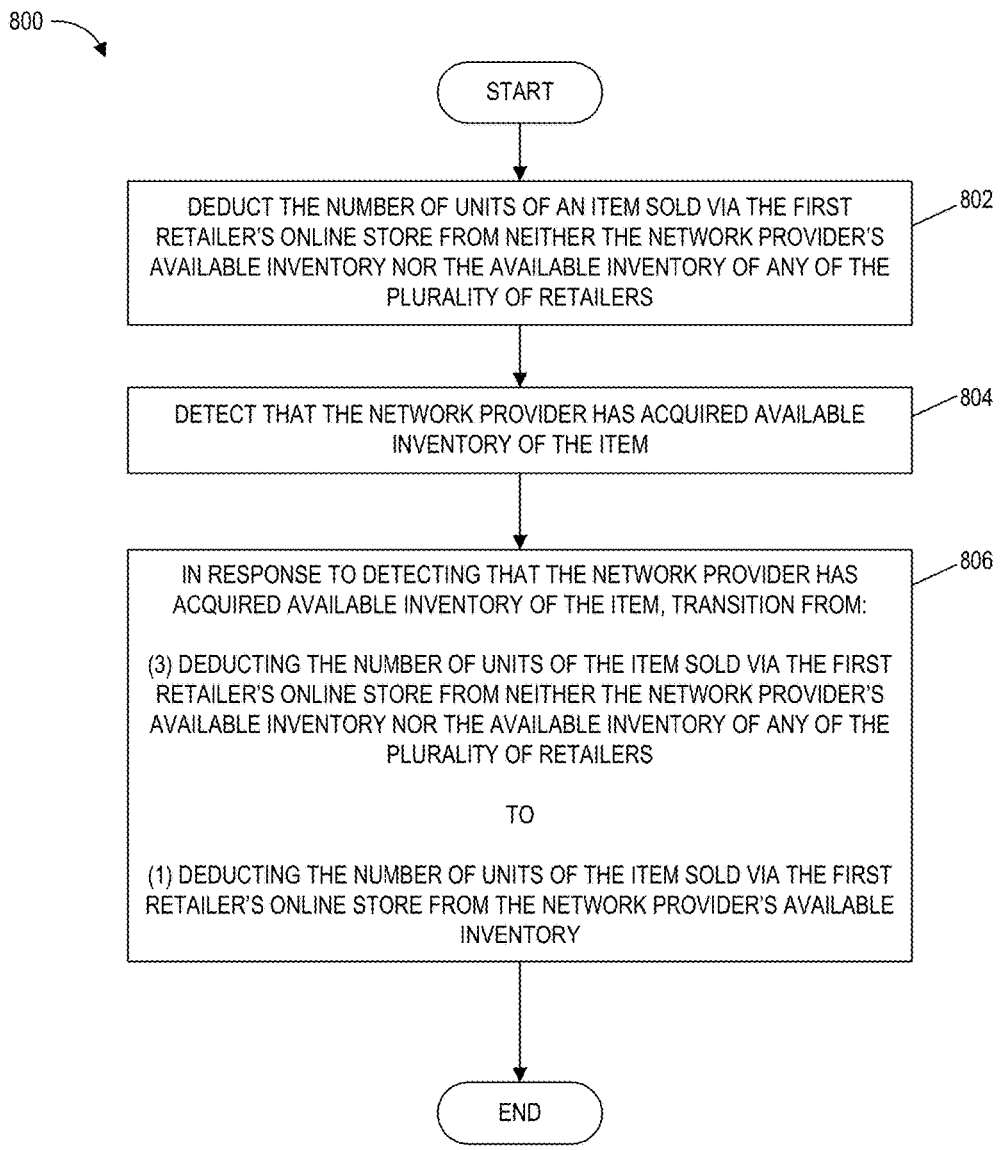
FIG. 8 is yet another flowchart of an example process for transitioning the database update process in accordance with aspects of the present disclosure.

FIG. 8 depicts yet another illustrative process 800 for transitioning the database update process in accordance with aspects of the present disclosure. The process 800 may be carried out, for example, by the network provider 110 (or a component thereof such as the inventory data manager 118). For convenience, some or all of the steps of the process 800 are described as being performed by the network provider 110. For example, the network provider 110 may include one or more hardware computing devices and non-transitory physical computer storage storing instructions that, when executed by the one or more hardware computing devices, cause the one or more hardware computing devices to perform the steps of the process 800.

The process 800 begins at block 802, where the network provider 110 updates the inventory database by deducting the number of units of an item sold via a first retailer's online store from neither the network provider's available inventory nor the available inventory of any of the retailers within the communication network 111.

At block 804, the network provider 110 detects that the network provider has acquired available inventory of the item.

At block 806, in response to detecting that the second retailer has acquired available inventory of the item, the network provider 110 transitions from (3) deducting the number of units of the item sold via the first retailer's online store from neither the network provider's available inventory nor the available inventory of any of the retailers within the communication network 111 in response to such sale being made via the first retailer's online store, to (1) deducting the number of units of the item sold via the first retailer's online store from the network provider's available inventory in response to such sale being made via the first retailer's online store. The process 800 may then end.

The process 800 can include fewer, more, or different blocks than those illustrated in FIG. 8 and/or one or more blocks illustrated in FIG. 8 may be modified, omitted, or switched without departing from the spirit and scope of the description. Moreover, it will be appreciated by those skilled in the art and others that some or all of the functions described in this disclosure may be embodied in software executed by one or more processors of the network provider 110 and/or the computing devices disclosed herein.

Example Computing Architecture of Network Provider

Figure 9:
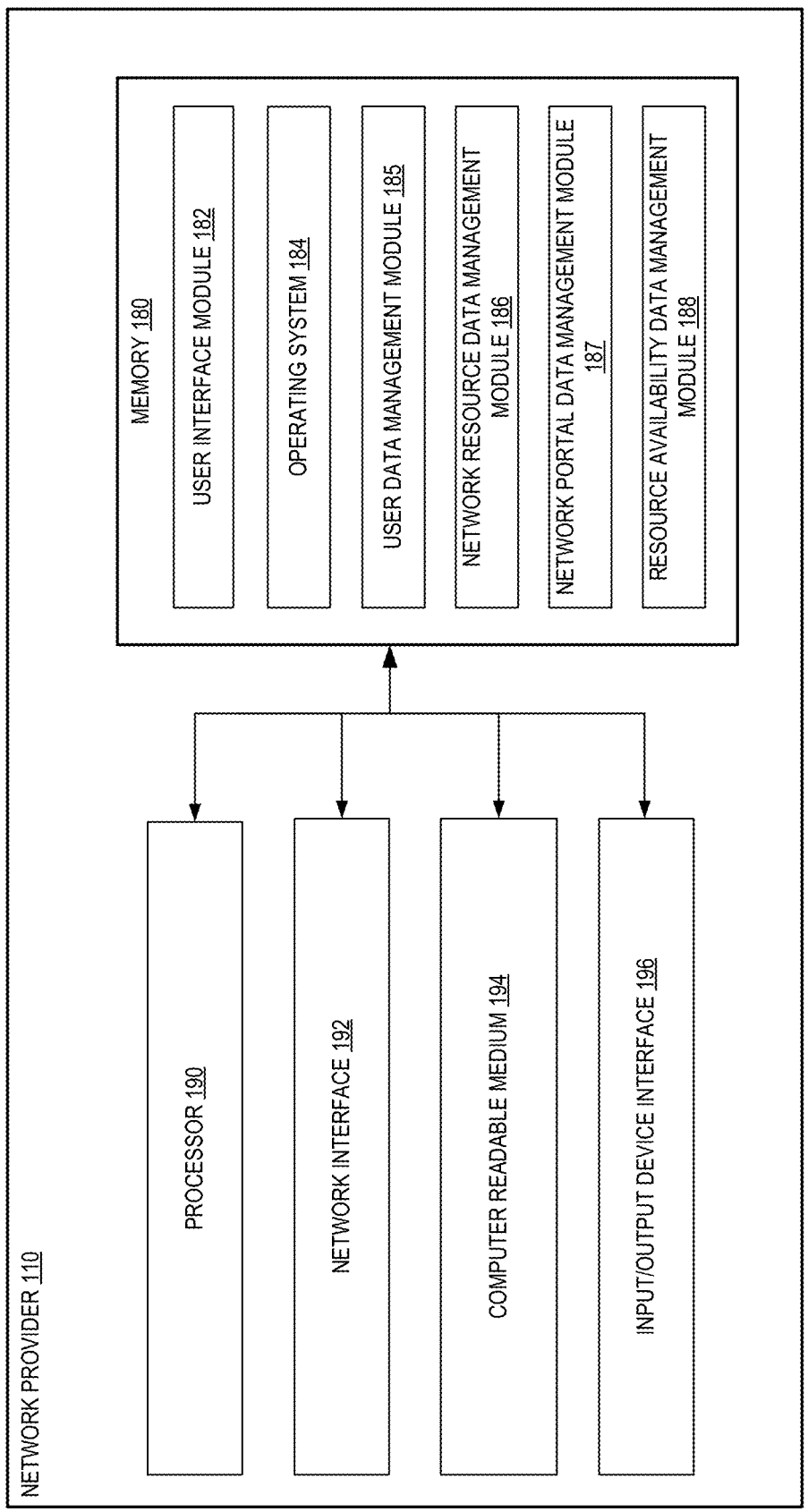
FIG. 9 depicts a general architecture of a computing device or system providing a network provider in accordance with aspects of the present disclosure.

FIG. 9 depicts an example architecture of the network provider 110 that can be used to perform one or more of the techniques described herein or illustrated in FIGS. 1-8 (or an example architecture of one or more computing devices that can be used to implement the network provider 110). The general architecture of the network provider 110 depicted in FIG. 9 includes an arrangement of computer hardware and software modules that may be used to implement one or more aspects of the present disclosure. The network provider 110 may include many more (or fewer) elements than those shown in FIG. 9. It is not necessary, however, that all of these elements be shown in order to provide an enabling disclosure. As illustrated, the network provider 110 includes a processor 190, a network interface 192, a computer readable medium 194, and an input/output device interface 196, all of which may communicate with one another by way of a communication bus. The network interface 192 may provide connectivity to one or more networks or computing systems. The processor 190 may also communicate with memory 180 and further provide output information for one or more output devices, such as a display, speaker, etc., via the input/output device interface 196, or provide responses or results over a network (e.g., network 104) via the network interface 192. Input to the network provider 110 may be received from one or more input devices such as a keyboard, mouse, digital pen, microphone, touch screen, gesture recognition system, or voice recognition system, or over a network via the network interface 192 (e.g., from another computing device within the communication network 111 or from a remote device such as the user devices 102).

The memory 180 may contain computer program instructions (grouped as modules in some implementations) that the processor 190 executes in order to implement one or more aspects of the present disclosure. The memory 180 may include RAM, ROM, and/or other persistent, auxiliary, or non-transitory computer-readable media. The memory 180 may store an operating system 184 that provides computer program instructions for use by the processor 190 in the general administration and operation of the network provider 110. The memory 180 may further include computer program instructions and other information for implementing one or more aspects of the present disclosure. For example, in one implementation, the memory 180 includes a user interface module 182 that generates user interfaces (and/or instructions therefor) for display, for example, via a browser or application installed on the user device 102.

In addition to and/or in combination with the user interface module 182, the memory 180 may include a user data management module 185, an item data management module 186, a store data management module 187, and an inventory data management module 188 that may be executed by the processor 190. The operations and algorithms of the modules 185-188 are described in greater detail above with reference to FIGS. 1-8.

Although a single processor, a single network interface, a single computer readable medium, a singer input/output device interface, and a single memory are illustrated in the example of FIG. 9, in other implementations, the network provider 110 can have a multiple of one or more of these components (e.g., two or more processors and/or two or more memories).

Multiple Privacy Levels

A sharing retailer can configure privacy settings such that a product shared by the sharing retailer is shared only with other retailers within the communication network 111 who satisfy certain criteria. When the sharing retailer uploads a product onto his or her online store, the sharing retailer can specify that the product is (i) private (not shared), (ii) public (shared with all retailers), or (iii) semi-private (shared only with a subset of "permitted retailers" or "friends" who are specified by the sharing retailer or who have an existing relationship or association with the sharing retailer such as by being connected, being friends, or having the sharing retailer's prior approval).

Sharing with Permitted Retailers

Another retailer in the communication network 111 ("selling retailer") can visit the sharing retailer's online store and request to become the sharing retailer's permitted retailer. Upon the sharing retailer's approval, the selling retailer becomes the sharing retailer's permitted retailer and gains access to the products that the sharing retailer uploads semi-privately. The selling retailer can visit the sharing retailer's online store, and select a product that the sharing retailer has uploaded semi-privately and cause the product to be displayed on the selling retailer's own online store.

Re-Sharing of Shared Products

When the sharing retailer uploads a product, the sharing retailer can specify whether another retailer ("third-party retailer") who sees the shared product on the selling retailer's online store can then choose to sell the shared product on his or her own online store. If the third-party retailer is allowed to do so, the third-party retailer can select the shared product on the selling retailer's online store and cause the shared product to be displayed on the third-party retailer's own online store, even though the third-party retailer is not one of the sharing retailer's permitted retailers and the sharing retailer uploaded the shared item semi-privately (and thus the sharing retailer did not directly share the product with the third-party retailer, meaning that the third-party retailer would not have been able to import the shared product into the third-party retailer's own online store either from the sharing retailer's online store or using product filters satisfied by the shared product).

Placing Geographical Limitations on Physical Stores

When the sharing retailer uploads a product publicly or semi-privately, the sharing retailer can further specify that the product should not be shared with retailers who own physical stores in certain geographical regions ("Allow all retailers to sell this product on their own online stores, unless they own a physical store in Los Angeles"). For example, the geographical limitation can specify one or more states, cities, zip codes, countries, and etc. to be excluded. As another example, the geographical limitation can specify one or more states, cities, zip codes, countries, and etc. to be allowed. In some implementations, the geographical limitation can be specified in terms of a radius around the physical store of the sharing retailer. For example, the sharing retailer may specify that the product should be shared with other retailers who own a physical store within a 25 mi radius from the sharing retailer's physical store in Los Angeles should not be allowed (e.g., thereby preventing such other retailers from selling the product on their respective online stores).

Field of Use

Various implementations are described in the context of a network provider providing a network of online stores on behalf of its users and allowing the users to share items across the network. However, the implementations are not limited as such, and the techniques described herein may be extended to other industries or fields. For example, the techniques of the present disclosure may be applied to any platform that provides a network of web pages or resources via which transactions can occur.

Enumerated Implementations (EIs)

Some enumerated implementations (EIs) are provided in this section, without limitation.

EI 1: A method for facilitating inventory database updates, the method comprising: providing an inventory database storing inventory information associated with a network provider and a plurality of retailers registered with the network provider, wherein the network provider is configured to provide, to each retailer of the plurality of retailers, (i) an online store accessible by the retailer's customers and (ii) a plurality of items that, upon the retailer's selection, become available on the retailer's online store and visible to visitors of the retailer's online store, wherein at least some of the plurality of items are supplied to the network provider by one or more suppliers of a plurality of suppliers registered with the network provider, and wherein the items supplied by the one or more suppliers are purchasable by the plurality of retailers for resale via the respective online stores of the plurality of retailers; determining, based on the inventory information stored in the inventory database, that the network provider has a first number of units of a first item of the plurality of items in stock, wherein the first item is supplied to the network provider by a first supplier of the plurality of suppliers, and wherein a first retailer of the plurality of retailers and a second retailer of the plurality of retailers have selected the first item to make the first item available for sale on their respective online stores; receiving, from a first visitor at the first retailer's online store, a first request to purchase the first item; determining whether any of the plurality of retailers has available inventory of the first item; in response to determining that none of the plurality of retailers has available inventory of the first item, determining whether the network provider has available inventory of the first item; in response to determining that the network provider has available inventory of the first item sufficient to cover the number of units of the first item requested by the first visitor, updating the inventory information to reduce the network provider's inventory of the first item, and not the first retailer's inventory of the first item, by the number of units of the first item sold by the first retailer to the first visitor via the first retailer's online store on behalf of the network provider using the network provider's inventory; causing the number of units of the first item purchased by the first visitor to be shipped to the first visitor; and continuing to sell the first item via one or more of the plurality of online stores provided by the network provider and to update the inventory information to reduce the network provider's available inventory of the first item by the number of units of the first item sold, as long as only the network provider has available inventory of the first item, wherein in response to the second retailer acquiring available inventory of the first item, the process of updating the inventory information transitions from (1) deducting the number of units of the first item sold via the first retailer's online store from the network provider's available inventory to (2) deducting the number of units of the first item sold via the first retailer's online store from the second retailer's available inventory.

EI 2: The method of any preceding EI or any combination of the preceding EIs, further comprising: subsequent to the sale to the first visitor, receiving, from a second visitor at the first retailer's online store, a second request to purchase the first item; determining whether any of the plurality of retailers has available inventory of the first item; determining, based on the inventory information, that the second retailer has available inventory of the first item sufficient to cover the number of units of the first item requested by the second visitor, wherein the second retailer's available inventory was purchased via the network provider without reducing the network provider's available inventory of the first item; updating the inventory information to reduce the second retailer's inventory of the first item, and not the first retailer's inventory of the first item, by the number of units of the first item sold by the first retailer to the second visitor via the first retailer's online store on behalf of the second retailer using the second retailer's inventory, without changing the network provider's available inventory of the first item; causing the number of units of the first item purchased by the second visitor to be shipped to the second visitor; and continuing to sell the first item via one or more of the plurality of online stores provided by the network provider and to update the inventory information to reduce the second retailer's available inventory of the first item by the number of units of the first item sold.

EI 3: The method of any preceding EI or any combination of the preceding EIs, wherein in response to the second retailer exhausting available inventory of the first item, the process of updating the inventory information transitions from (2) deducting the number of units of the first item sold via the first retailer's online store from the second retailer's available inventory to (3) deducting the number of units of the first item sold via the first retailer's online store from neither the network provider's available inventory nor the available inventory of any of the plurality of retailers.

EI 4: The method of any preceding EI or any combination of the preceding EIs, further comprising: subsequent to the sale to the second visitor, receiving, from a third visitor at the first retailer's online store, a third request to purchase the first item; determining whether any of the plurality of retailers has available inventory of the first item; in response to determining, based on the inventory information, that none of the plurality of retailers has available inventory of the first item, determining whether the network provider has available inventory of the first item; and in response to determining, based on the inventory information, that the network provider has no inventory of the first item, causing the number of units of the first item purchased by the third visitor to be shipped to the third visitor without updating the inventory information to change the available inventory of the first item of either the network provider or any of the plurality of retailers, despite the inventory information indicating that none of the network provider and the plurality of retailers has available inventory of the first item.

EI 5: The method of any preceding EI or any combination of the preceding EIs, wherein in response to the network provider acquiring available inventory of the first item, the process of updating the inventory information transitions from (3) deducting the number of units of the first item sold via the first retailer's online store from neither the network provider's available inventory nor the available inventory of any of the plurality of retailers to (1) deducting the number of units of the first item sold via the first retailer's online store from the network provider's available inventory.

EI 6: The method of any preceding EI or any combination of the preceding EIs, further comprising causing the first item to be visible on the first retailer's online store along with a second item uploaded by the first retailer.

EI 7: The method of any preceding EI or any combination of the preceding EIs, further comprising causing the first item to be visible on the first retailer's online store along with a second item uploaded by a second supplier of the plurality of suppliers.

EI 8: The method of any preceding EI or any combination of the preceding EIs, further comprising providing a notification to the second retailer that one of the second retailer's items has been sold via the first retailer's online store along with shipping information associated with the second visitor and information associated with the first retailer to be included in a shipment to the second visitor along with the first item.

EI 9: The method of any preceding EI or any combination of the preceding EIs, further comprising, in response to the purchase of the first item by the second visitor and prior to updating the inventory information to reduce the second retailer's inventory of the first item in response to the purchase of the first item by the second visitor, updating available quantity information associated with the first item to reduce the number of units of the first item owned by the second retailer and available for sale.

EI 10: The method of any preceding EI or any combination of the preceding EIs, further comprising, in response to the shipment of the first item to the second visitor and subsequent to updating the available quantity information associated with the first item in response to the purchase of the first item by the second visitor, updating the inventory information to reduce the number of units of the first item owned by the second retailer and available for sale.

EI 11: A system for facilitating inventory database updates, the system comprising: a network provider comprising one or more computing devices; an inventory database storing inventory information associated with the network provider and a plurality of retailers registered with the network provider; a plurality of online stores provided by the network provider, wherein the plurality of online stores are each associated with a respective retailer of the plurality of retailers and accessible by the respective retailer's customers; and a plurality of items provided by the network provider and available for display on the plurality of online stores, wherein the network provider is configured to: determine, based on the inventory information stored in the inventory database, that the network provider has a first number of units of a first item of the plurality of items in stock, wherein a first retailer of the plurality of retailers and a second retailer of the plurality of retailers have selected the first item to make the first item available for sale on their respective online stores; receive, from a first visitor at the first retailer's online store, a first request to purchase the first item; determine whether any of the plurality of retailers has available inventory of the first item; in response to determining that none of the plurality of retailers has available inventory of the first item, determine whether the network provider has available inventory of the first item; in response to determining that the network provider has available inventory of the first item sufficient to cover the number of units of the first item requested by the first visitor, update the inventory information to reduce the network provider's inventory of the first item, and not the first retailer's inventory of the first item, by the number of units of the first item sold by the first retailer to the first visitor via the first retailer's online store on behalf of the network provider using the network provider's inventory; cause the number of units of the first item purchased by the first visitor to be shipped to the first visitor; and continue to cause the first item to be sold via one or more of the plurality of online stores provided by the network provider and to update the inventory information to reduce the network provider's available inventory of the first item by the number of units of the first item sold, as long as only the network provider has available inventory of the first item; wherein in response to the second retailer acquiring available inventory of the first item, the process of updating the inventory information transitions from (1) deducting the number of units of the first item sold via the first retailer's online store from the network provider's available inventory to (2) deducting the number of units of the first item sold via the first retailer's online store from the second retailer's available inventory.

EI 12: The system of any preceding EI or any combination of the preceding EIs, wherein the network provider is further configured to: subsequent to the sale to the first visitor, receive, from a second visitor at the first retailer's online store, a second request to purchase the first item; determine whether any of the plurality of retailers has available inventory of the first item; determine, based on the inventory information, that the second retailer has available inventory of the first item sufficient to cover the number of units of the first item requested by the second visitor, wherein the second retailer's available inventory was purchased via the network provider without reducing the network provider's available inventory of the first item; update the inventory information to reduce the second retailer's inventory of the first item, and not the first retailer's inventory of the first item, by the number of units of the first item sold by the first retailer to the second visitor via the first retailer's online store on behalf of the second retailer using the second retailer's inventory, without changing the network provider's available inventory of the first item; cause the number of units of the first item purchased by the second visitor to be shipped to the second visitor; and continuing to cause the first item to be sold via one or more of the plurality of online stores provided by the network provider and to update the inventory information to reduce the second retailer's available inventory of the first item by the number of units of the first item sold.

EI 13: The system of any preceding EI or any combination of the preceding EIs, wherein in response to the second retailer exhausting available inventory of the first item, the process of updating the inventory information transitions from (2) deducting the number of units of the first item sold via the first retailer's online store from the second retailer's available inventory to (3) deducting the number of units of the first item sold via the first retailer's online store from neither the network provider's available inventory nor the available inventory of any of the plurality of retailers.

EI 14: The system of any preceding EI or any combination of the preceding EIs, wherein the network provider is further configured to: subsequent to the sale to the second visitor, receive, from a third visitor at the first retailer's online store, a third request to purchase the first item; determine whether any of the plurality of retailers has available inventory of the first item; in response to determining, based on the inventory information, that none of the plurality of retailers has available inventory of the first item, determine whether the network provider has available inventory of the first item; and in response to determining, based on the inventory information, that the network provider has no inventory of the first item, cause the number of units of the first item purchased by the third visitor to be shipped to the third visitor without updating the inventory information to change the available inventory of the first item of either the network provider or any of the plurality of retailers, despite the inventory information indicating that none of the network provider and the plurality of retailers has available inventory of the first item.

EI 15: The system of any preceding EI or any combination of the preceding EIs, wherein in response to the network provider acquiring available inventory of the first item, the process of updating the inventory information transitions from (3) deducting the number of units of the first item sold via the first retailer's online store from neither the network provider's available inventory nor the available inventory of any of the plurality of retailers to (1) deducting the number of units of the first item sold via the first retailer's online store from the network provider's available inventory.

EI 16: The system of any preceding EI or any combination of the preceding EIs, wherein the network provider is further configured to cause the first item to be visible on the first retailer's online store along with a second item uploaded by the first retailer.

EI 17: The system of any preceding EI or any combination of the preceding EIs, wherein the network provider is further configured to cause the first item to be visible on the first retailer's online store along with a second item uploaded by a second supplier of the plurality of suppliers.

EI 18: The system of any preceding EI or any combination of the preceding EIs, wherein the network provider is further configured to provide a notification to the second retailer that one of the second retailer's items has been sold via the first retailer's online store along with shipping information associated with the second visitor and information associated with the first retailer to be included in a shipment to the second visitor along with the first item.

EI 19: The system of any preceding EI or any combination of the preceding EIs, wherein the network provider is further configured to, in response to the purchase of the first item by the second visitor and prior to updating the inventory information to reduce the second retailer's inventory of the first item in response to the purchase of the first item by the second visitor, update available quantity information associated with the first item to reduce the number of units of the first item owned by the second retailer and available for sale.

EI 20: The system of any preceding EI or any combination of the preceding EIs, wherein the network provider is further configured to, in response to the shipment of the first item to the second visitor and subsequent to updating the available quantity information associated with the first item in response to the purchase of the first item by the second visitor, updating the inventory information to reduce the number of units of the first item owned by the second retailer and available for sale.

Other Considerations

Depending on the implementation, certain acts, events, or functions of any of the algorithms described herein can be performed in a different sequence, can be added, merged, or left out altogether (e.g., not all described acts or events are necessary for the practice of the algorithms). Moreover, in certain implementations, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

Logical blocks, modules or units described in connection with implementations disclosed herein can be implemented or performed by a computing device having at least one processor, at least one memory, and at least one communication interface. The elements of a method, process, or algorithm described in connection with implementations disclosed herein can be embodied directly in hardware, in a software module executed by at least one processor, or in a combination of the two. Computer-executable instructions for implementing a method, process, or algorithm described in connection with implementations disclosed herein can be stored in a non-transitory computer readable storage medium.

Although the implementations of the inventions have been disclosed in the context of certain implementations and examples, it will be understood by those skilled in the art that the present inventions extend beyond the specifically disclosed implementations to other alternative implementations and/or uses of the inventions and obvious modifications and equivalents thereof. In addition, while a number of variations of the inventions have been shown and described in detail, other modifications, which are within the scope of the inventions, will be readily apparent to those of skill in the art based upon this disclosure. It is also contemplated that various combinations or subcombinations of the specific features and aspects of the implementations may be made and still fall within one or more of the inventions. Accordingly, it should be understood that various features and aspects of the disclosed implementations can be combined with or substituted for one another in order to form varying modes of the disclosed inventions. Thus, it is intended that the scope of the present inventions herein disclosed should not be limited by the particular disclosed implementations described above, and that various changes in form and details may be made without departing from the spirit and scope of the present disclosure as set forth in the following claims.

What is claimed is:

1. A method for facilitating management of network resources, the method comprising:
providing a database storing network resource availability information associated with a network provider and a plurality of internal users registered with the network provider, wherein the network provider is configured to provide, to each internal user of the plurality of internal users, (i) a network portal accessible by other users of the network provider and (ii) a plurality of network resources that, upon the internal user's selection, become available on the internal user's network portal and accessible to visitors of the internal user's network portal, wherein the plurality of network resources includes a set of external network resources provided by an external user of the network provider that does not have a network portal, and wherein the set of external network resources provided by the external user is selectable by the plurality of internal users to cause the set of external network resources to be accessible via the respective network portals of the plurality of internal users;
determining, based on the network resource availability information stored in the database, that the network provider has a first amount of a first network resource of the plurality of network resources available, wherein the first network resource is provided to the network provider by a first external user of the network provider, and wherein a first internal user of the plurality of internal users and a second internal user of the plurality of internal users have selected the first network resource to cause the first network resource to be accessible on their respective network portals;
receiving, from a first user computing device, a first resource request to access the first network resource via a first network portal associated with the first internal user, wherein the first resource request indicates a first amount of the first network resource;
determining whether any of the plurality of internal users has an amount of the first network resource greater than or equal to the first amount indicated by the first resource request;
in response to determining that none of the plurality of internal users has an amount of the first network resource greater than or equal to the first amount indicated by the first resource request, determining whether the network provider has an amount of the first network resource greater than or equal to the first amount indicated by the first resource request;
in response to determining that the network provider does have an amount of the first network resource greater than or equal to the first amount indicated by the first resource request, updating the network resource availability information to reduce a total amount of the first network resource associated with the network provider by the first amount indicated by the first resource request;
granting the first resource request from the first user computing device such that the first amount of the first network resource indicated by the first resource request is made accessible to a first user of the first user computing device;
continuing to process and grant a first set of resource requests received via one or more of the plurality of network portals provided by the network provider and to update the network resource availability information to reduce the network provider's available amount of the first network resource to reflect the granted first set of resource requests, as long as only the network provider has availability of the first network resource; and detecting an alternative source of the first network resource other than the network provider, wherein the alternative source of the first network resource is associated with a second internal user of the network provider, wherein in response to detecting the alternative source of the first network resource other than the network provider, the process of updating the network resource availability information in the database transitions from (1) deducting the amount of the first network resource requested and granted via the first internal user's network portal from the network provider's available amount of the first network resource to (2) deducting the amount of the first network resource requested and granted via the first internal user's network portal from the second internal user's available amount of the first network resource.

2. The method of claim 1, further comprising:

subsequent to the granting of the first resource request, receiving, from a second user computing device, a second resource request to access the first network resource via the first network portal associated with the first internal user, wherein the second resource request indicates a second amount of the first network resource;

determining whether any of the plurality of internal users has an amount of the first network resource greater than or equal to the second amount indicated by the second resource request;

determining, based on the network resource availability information, that the second internal user has an amount of the first network resource greater than or equal to the second amount indicated by the second resource request, wherein the second internal user's available amount of the first network resource was acquired via the network provider without reducing the network provider's available amount of the first network resource;

updating the network resource availability information to reduce the second internal user's available amount of the first network resource by the second amount indicated by the second resource request, without changing the network provider's available amount of the first network resource;

granting the second resource request from the second user computing device such that the second amount of the first network resource indicated by the second resource request is made accessible to a second user of the second user computing device; and continuing to process and grant a second set of resource requests received via one or more of the plurality of network portals provided by the network provider and to update the network resource availability information to reduce the second internal user's available amount of the first network resource to reflect the granted second set of resource requests, as long as only the second internal user has availability of the first network resource out of the plurality of internal users.

3. The method of claim 2, further comprising detecting a depletion of the second internal user's available amount of the first network resource, wherein in response to detecting the depletion of the second internal user's available amount of the first network resource, the process of updating the network resource availability information in the database transitions from (2) deducting the amount of the first network resource requested and granted via the first internal user's network portal from the second internal user's available amount of the first network resource to (3) deducting the amount of the first network resource requested and granted via the first internal user's network portal from neither the network provider's available amount of the first network resource nor an available amount of the first network resource belonging to any of the plurality of internal users.

4. The method of claim 2, further comprising:

subsequent to the granting of the second resource request, receiving, from a third user computing device, a third resource request to access the first network resource via the first network portal associated with the first internal user, wherein the third resource request indicates a third amount of the first network resource;

determining whether any of the plurality of internal users has an amount of the first network resource greater than or equal to the third amount indicated by the third resource request;

in response to determining, based on the network resource availability information, that none of the plurality of internal users has an amount of the first network resource greater than or equal to the third amount indicated by the third resource request, determining whether the network provider has an amount of the first network resource greater than or equal to the third amount indicated by the third resource request; and in response to determining, based on the network resource availability information, that the network provider has no availability of the first network resource, granting the third resource request from the third user computing device, such that the third amount of the first network resource indicated by the third resource request is made accessible to a third user of the third user computing device, without updating the network resource availability information to change the available amount of the first network resource of either the network provider or any of the plurality of internal users, despite the network resource availability information indicating that none of the network provider and the plurality of internal users has an available amount of the first network resource.

5. The method of claim 4, further comprising detecting an acquisition of an additional amount of the first network resource by the network provider, wherein in response to detecting the acquisition of the additional amount of the first network resource by the network provider, the process of updating the network resource availability information in the database transitions from (3) deducting the amount of the first network resource requested and granted via the first internal user's network portal from neither the network provider's available amount of the first network resource nor an available amount of the first network resource belonging to any of the plurality of internal users to (1) deducting the amount of the first network resource requested and granted via the first internal user's network portal from the network provider's available amount of the first network resource.

6. The method of claim 1, further comprising causing the first network resource to be outputted via the first internal user's network portal along with a second network resource originated by the first internal user.

7. The method of claim 1, further comprising causing the first network resource to be outputted via the first internal user's network portal along with a second network resource originated by a second external user of the network provider, wherein the second external user is not assigned its own network portal by the network provider.

8. The method of claim 2, further comprising transmitting a notification to the second internal user that a request to access an amount of the first network resource belonging to the second internal user has been granted via the first internal user's network portal along with user information associated with the second user that is usable by the second internal user to facilitate a provisioning of the first network resource to the second user.

9. The method of claim 2, further comprising, in response to granting the second resource request from the second user computing device and prior to updating the network resource availability information in the database to reduce the second internal user's available amount of the first network resource in response to the granting of the second resource request, updating unclaimed resource amount information associated with the first network resource to reduce the amount of the first network resource selectable via the first internal user's network portal for requesting access.

10. The method of claim 9, further comprising, in response to provisioning the first network resource to the second user and subsequent to updating the unclaimed resource amount information associated with the first network resource in response to the granting of the second resource request, updating the network resource availability information to reduce the amount of the first network resource owned by the second internal user to reflect the second amount of the network resource provisioned to the second user.

11. A system for facilitating management of network resources, the system comprising:
  a network provider comprising one or more computing devices;
  a database storing network resource availability information associated with the network provider and a plurality of internal users registered with the network provider;
  a plurality of network portals provided by the network provider, wherein the plurality of network portals are each associated with a respective internal user of the plurality of internal users and accessible by other users of the network provider; and
  a plurality of network resources provided by the network provider and available for display on the plurality of network portals,
  wherein the network provider is configured to:
    determine, based on the network resource availability information stored in the database, that the network provider has a first amount of a first network resource of the plurality of network resources available, wherein the first network resource is provided to the network provider by a first external user of the network provider, and wherein a first internal user of the plurality of internal users and a second internal user of the plurality of internal users have selected the first network resource to cause the first network resource to be accessible on their respective network portals;
    receive, from a first user computing device, a first resource request to access the first network resource via a first network portal associated with the first internal user, wherein the first resource request indicates a first amount of the first network resource;
    determine whether any of the plurality of internal users has an amount of the first network resource greater than or equal to the first amount indicated by the first resource request;
    in response to determining that none of the plurality of internal users has an amount of the first network resource greater than or equal to the first amount indicated by the first resource request, determine whether the network provider has an amount of the first network resource greater than or equal to the first amount indicated by the first resource request;
    in response to determining that the network provider does have an amount of the first network resource greater than or equal to the first amount indicated by the first resource request, update the network resource availability information to reduce a total amount of the first network resource associated with the network provider by the first amount indicated by the first resource request;
    grant the first resource request from the first user computing device such that the first amount of the first network resource indicated by the first resource request is made accessible to a first user of the first user computing device;
    continue to process and grant a first set of resource requests received via one or more of the plurality of network portals provided by the network provider and to update the network resource availability information to reduce the network provider's available amount of the first network resource to reflect the granted first set of resource requests, as long as only the network provider has availability of the first network resource; and
    detect an alternative source of the first network resource other than the network provider, wherein the alternative source of the first network resource is associated with a second internal user of the network provider,
  wherein in response to detecting the alternative source of the first network resource other than the network provider, the process of updating the network resource availability information in the database transitions from (1) deducting the amount of the first network resource requested and granted via the first internal user's network portal from the network provider's available amount of the first network resource to (2) deducting the amount of the first network resource requested and granted via the first internal user's network portal from the second internal user's available amount of the first network resource.

12. The system of claim 11, wherein the network provider is further configured to:
  subsequent to the granting of the first resource request, receive, from a second user computing device, a second resource request to access the first network resource via the first network portal associated with the first internal user, wherein the second resource request indicates a second amount of the first network resource;
  determine whether any of the plurality of internal users has an amount of the first network resource greater than or equal to the second amount indicated by the second resource request;
  determine, based on the network resource availability information, that the second internal user has an amount of the first network resource greater than or equal to the second amount indicated by the second resource request, wherein the second internal user's available amount of the first network resource was acquired via the network provider without reducing the network provider's available amount of the first network resource;
  update the network resource availability information to reduce the second internal user's available amount of the first network resource by the second amount indicated by the second resource request, without changing the network provider's available amount of the first network resource;

grant the second resource request from the second user computing device such that the second amount of the first network resource indicated by the second resource request is made accessible to a second user of the second user computing device; and continue to process and grant a second set of resource requests received via one or more of the plurality of network portals provided by the network provider and to update the network resource availability information to reduce the second internal user's available amount of the first network resource to reflect the granted second set of resource requests, as long as only the second internal user has availability of the first network resource out of the plurality of internal users.

13. The system of claim 12, wherein the network provider is further configured to detect a depletion of the second internal user's available amount of the first network resource, wherein in response to detecting the depletion of the second internal user's available amount of the first network resource, the process of updating the network resource availability information in the database transitions from (2) deducting the amount of the first network resource requested and granted via the first internal user's network portal from the second internal user's available amount of the first network resource to (3) deducting the amount of the first network resource requested and granted via the first internal user's network portal from neither the network provider's available amount of the first network resource nor an available amount of the first network resource belonging to any of the plurality of internal users.

14. The system of claim 12, wherein the network provider is further configured to:
subsequent to the granting of the second resource request, receive, from a third user computing device, a third resource request to access the first network resource via the first network portal associated with the first internal user, wherein the third resource request indicates a third amount of the first network resource;
determine whether any of the plurality of internal users has an amount of the first network resource greater than or equal to the third amount indicated by the third resource request;
in response to determining, based on the network resource availability information, that none of the plurality of internal users has an amount of the first network resource greater than or equal to the third amount indicated by the third resource request, determine whether the network provider has an amount of the first network resource greater than or equal to the third amount indicated by the third resource request; and
in response to determining, based on the network resource availability information, that the network provider has no availability of the first network resource, grant the third resource request from the third user computing device, such that the third amount of the first network resource indicated by the third resource request is made accessible to a third user of the third user computing device, without updating the network resource availability information to change the available amount of the first network resource of either the network provider or any of the plurality of internal users, despite the network resource availability information indicating that none of the network provider and the plurality of internal users has an available amount of the first network resource.

15. The system of claim 14, wherein the network provider is further configured to detect an acquisition of an additional amount of the first network resource by the network provider, wherein in response to detecting the acquisition of the additional amount of the first network resource by the network provider, the process of updating the network resource availability information in the database transitions from (3) deducting the amount of the first network resource requested and granted via the first internal user's network portal from neither the network provider's available amount of the first network resource nor an available amount of the first network resource belonging to any of the plurality of internal users to (1) deducting the amount of the first network resource requested and granted via the first internal user's network portal from the network provider's available amount of the first network resource.

16. The system of claim 11, wherein the network provider is further configured to cause the first network resource to be outputted via the first internal user's network portal along with a second network resource originated by the first internal user.

17. The system of claim 11, wherein the network provider is further configured to cause the first network resource to be outputted via the first internal user's network portal along with a second network resource originated by a second external user of the network provider, wherein the second external user is not assigned its own network portal by the network provider.

18. The system of claim 12, wherein the network provider is further configured to transmit a notification to the second internal user that a request to access an amount of the first network resource belonging to the second internal user has been granted via the first internal user's network portal along with user information associated with the second user that is usable by the second internal user to facilitate a provisioning of the first network resource to the second user.

19. The system of claim 12, wherein the network provider is further configured to, in response to granting the second resource request from the second user computing device and prior to updating the network resource availability information in the database to reduce the second internal user's available amount of the first network resource in response to the granting of the second resource request, update unclaimed resource amount information associated with the first network resource to reduce the amount of the first network resource selectable via the first internal user's network portal for requesting access.

20. The system of claim 19, wherein the network provider is further configured to, in response to provisioning the first network resource to the second user and subsequent to updating the unclaimed resource amount information associated with the first network resource in response to the granting of the second resource request, update the network resource availability information to reduce the amount of the first network resource owned by the second internal user to reflect the second amount of the network resource provisioned to the second.

* * * * *